(12) United States Patent
Guo et al.

(10) Patent No.: US 9,547,107 B2
(45) Date of Patent: Jan. 17, 2017

(54) DYE AND PIGMENT-FREE STRUCTURAL COLORS AND ANGLE-INSENSITIVE SPECTRUM FILTERS

(71) Applicant: THE REGENTS OF THE UNIVERSITY OF MICHIGAN, Ann Arbor, MI (US)

(72) Inventors: Lingjie Jay Guo, Ann Arbor, MI (US); Andrew E. Hollowell, Albuquerque, NM (US); Yi-Kuei Wu, Bloomington, MN (US)

(73) Assignee: The Regents Of The University Of Michigan, Ann Arbor, MI (US)

(*) Notice: Subject to any disclaimer, the term of this patent is extended or adjusted under 35 U.S.C. 154(b) by 195 days.

(21) Appl. No.: 14/210,742

(22) Filed: Mar. 14, 2014

(65) Prior Publication Data
US 2014/0268332 A1    Sep. 18, 2014

Related U.S. Application Data

(60) Provisional application No. 61/793,559, filed on Mar. 15, 2013.

(51) Int. Cl.
*G02B 5/00* (2006.01)
*G02B 5/30* (2006.01)
(Continued)

(52) U.S. Cl.
CPC .............. *G02B 5/008* (2013.01); *B82Y 20/00* (2013.01); *G02B 5/201* (2013.01); *G02B 5/26* (2013.01);
(Continued)

(58) Field of Classification Search
CPC ....... G02B 5/008; G02B 5/003; G02B 5/0816; G02B 5/085; G02B 5/0858; G02B 5/0875; G02B 5/20; G02B 5/201; G02B 5/204; G02B 5/22; G02B 5/26; G02B 5/28; G02B 5/284; G02B 5/285; G02B 5/3058; G02B 2005/1804; G02B 17/004
(Continued)

(56) References Cited

U.S. PATENT DOCUMENTS

| 5,381,232 A | 1/1995 | van Wijk |
| 5,570,139 A | 10/1996 | Wang |

(Continued)

FOREIGN PATENT DOCUMENTS

| CN | 1900750 A | 1/2007 |
| CN | 101063726 A | 10/2007 |

(Continued)

OTHER PUBLICATIONS

Nguyen-Huu, Nghia, et al., "Color filters featuring high treansmission efficiency and broad bandwidth based on resonant waveguide-metallic grating," Optics Communications, vol. 284, No. 10-11, pp. 2473-2479 (May 15, 2011).*

(Continued)

*Primary Examiner* — Bumsuk Won
*Assistant Examiner* — Ephrem Mebrahtu
(74) *Attorney, Agent, or Firm* — Harness, Dickey & Pierce, PLC

(57) ABSTRACT

Optical spectrum filtering devices displaying minimal angle dependence or angle insensitivity are provided. The filter comprises a localized plasmonic nanoresonator assembly having a metal material layer defining at least one nanogroove and a dielectric material disposed adjacent to the metal material layer. The dielectric material is disposed within the nanogroove(s). The localized plasmonic nanoresonator assembly is configured to funnel and absorb a portion of an electromagnetic spectrum in the at least one nanogroove via localized plasmonic resonance to generate a (Continued)

Figures 1A, 1B, 1C, 1D:
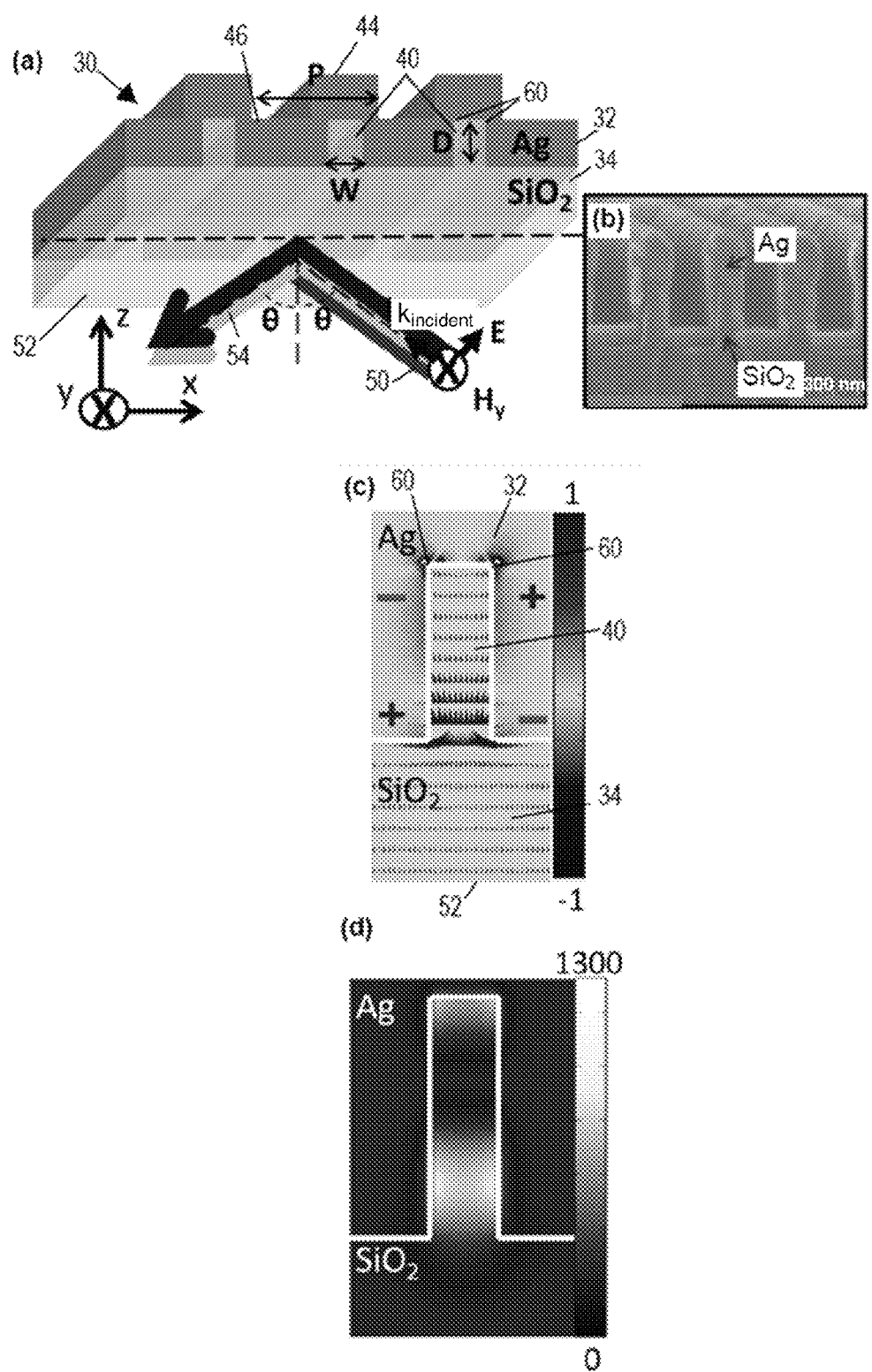

filtered output having a predetermined range of wavelengths that displays angle insensitivity. Thus, flexible, high efficiency angle independent color filters having very small diffraction limits are provided that are particularly suitable for use as pixels for various display devices or for use in anti-counterfeiting and cryptography applications. The structures can also be used for colored print applications and the elements can be rendered as pigment-like particles.

10 Claims, 14 Drawing Sheets

(51) Int. Cl.
G02B 5/32 (2006.01)
B82Y 20/00 (2011.01)
G02B 5/20 (2006.01)
G02B 5/26 (2006.01)

(52) U.S. Cl.
CPC .......... *G02B 5/3058* (2013.01); *Y10S 977/784* (2013.01); *Y10S 977/834* (2013.01)

(58) Field of Classification Search
USPC ............... 359/577, 582, 584–586, 589–591
See application file for complete search history.

(56) References Cited

U.S. PATENT DOCUMENTS

| | | | |
|---|---|---|---|
| 5,986,808 | A | 11/1999 | Wang |
| 6,031,653 | A | 2/2000 | Wang |
| 6,046,401 | A | 4/2000 | McCabe |
| 6,097,456 | A | 8/2000 | Wang |
| 6,317,264 | B1 | 11/2001 | Ll et al. |
| 6,807,342 | B2 | 10/2004 | Fan |
| 6,924,859 | B2 | 8/2005 | Ishii et al. |
| 6,992,826 | B2 | 1/2006 | Wang |
| 7,106,402 | B2 | 9/2006 | Suzuki et al. |
| 7,169,251 | B2 | 1/2007 | Guo et al. |
| 7,248,297 | B2 | 7/2007 | Catrysse et al. |
| 7,609,339 | B2 | 10/2009 | Choi |
| 7,648,767 | B2 | 1/2010 | Fu et al. |
| 7,649,597 | B2 | 1/2010 | Ikeno et al. |
| 7,734,131 | B2 | 6/2010 | Lin et al. |
| 7,916,301 | B2 | 3/2011 | Dahlgren |
| 8,130,440 | B2 | 3/2012 | Kothari et al. |
| 8,547,504 | B2 | 10/2013 | Guo et al. |
| 8,848,140 | B2 | 9/2014 | Guo et al. |
| 9,261,753 | B2 | 2/2016 | Guo et al. |
| 2006/0014761 | A1 | 1/2006 | Morgan et al. |
| 2006/0147617 | A1 | 7/2006 | Chen et al. |
| 2006/0205107 | A1 | 9/2006 | Inaba et al. |
| 2006/0262250 | A1 | 11/2006 | Hobbs |
| 2006/0262253 | A1 | 11/2006 | Teramoto et al. |
| 2006/0286663 | A1 | 12/2006 | Cunningham et al. |
| 2007/0019292 | A1 | 1/2007 | Kim et al. |
| 2007/0102035 | A1 | 5/2007 | Yang et al. |
| 2009/0046362 | A1 | 2/2009 | Guo et al. |
| 2009/0219623 | A1 | 9/2009 | Shalaev et al. |
| 2009/0256287 | A1 | 10/2009 | Fu et al. |
| 2010/0002979 | A1 | 1/2010 | Diest et al. |
| 2010/0091217 | A1 | 4/2010 | Kim et al. |
| 2010/0315579 | A1 | 12/2010 | Huang |
| 2011/0019139 | A1 | 1/2011 | Cui et al. |
| 2011/0085238 | A1 | 4/2011 | Minemura et al. |
| 2011/0285942 | A1* | 11/2011 | Guo ............. G02B 5/008 349/96 |
| 2012/0086887 | A1 | 4/2012 | Lee et al. |
| 2012/0287362 | A1 | 11/2012 | Hashimura et al. |
| 2013/0037109 | A1 | 2/2013 | Park et al. |

FOREIGN PATENT DOCUMENTS

| | | | |
|---|---|---|---|
| EP | 1571467 | A2 | 9/2005 |
| EP | 2564247 | A2 | 3/2013 |
| JP | H11-295725 | A | 10/1999 |
| JP | 2000/111851 | A | 4/2000 |
| JP | 2007/025692 | A | 2/2007 |
| JP | 2009/500832 | A | 1/2009 |
| JP | 2009/145742 | A | 7/2009 |
| JP | 2009/169213 | A | 7/2009 |
| JP | 2010/008990 | A | 1/2010 |
| WO | 2011/026942 | A2 | 3/2011 |
| WO | 2011/112714 | A2 | 9/2011 |
| WO | 2011/139785 | A2 | 11/2011 |
| WO | 2011/150231 | A2 | 12/2011 |
| WO | 2012/145677 | A2 | 10/2012 |
| WO | 2012/167076 | A2 | 12/2012 |

OTHER PUBLICATIONS

Barnes, William L., et al., "Surface plasmon subwavelength optics," Nature, vol. 424, pp. 824-830 (Aug. 14, 2003).
Chen, Qin, et al., "High transmission and low color cross-talk plasmonic color filters using triangular-lattice hole arrays in aluminum films," Optics Express, vol. 18, No. 13, pp. 14056-14062 (Jun. 21, 2010) (published online Jun. 15, 2010).
Diest, Kenneth, et al., "Tunable Color Filters Based on Metal?Insulator?Metal Resonators," Nano Letters, vol. 9, No. 7, pp. 2579-2583 (2009) (published online Jun. 15, 2009) (Abstract only).
Ebbesen, T.W., et al., "Extraordinary optical transmission through sub-wavelength hole arrays," Nature, vol. 391, pp. 567-669 (Feb. 12, 1998).
Genet, C., et al., "Light in tiny holes," Nature, vol. 445, pp. 39-46 (Jan. 4, 2007).
Inoue, Daisuke, et al., "Polarization independent color filter comprising an aluminum film with surface-plasmon enhanced transmission through a subwavelength array of holes," Applied Physics Letters, vol. 98, No. 9, pp. 093113-093115 (2011) (published online Mar. 2, 2011) (Abstract only).
Kats, Mikhail A., et al., "Nanometre optical coatings based on strong interference effects in highly absorbing media," Nature Materials, vol. 12, pp. 20-24 (published online Oct. 14, 2012).
Laux, Eric, et al., "Plasmonic photon sorters for spectral and polarimetric imaging," Nature Photonics, vol. 2, pp. 161-164 (2008) (published online Feb. 24, 2008) (Abstract only).
Supplementary Partial European Search Report issued on Feb. 2, 2015 in European Application No. 12773766.6.
Lezec, H.J., et al., "Beaming Light from a Subwavelength Aperture," Science, vol. 297, pp. 820-822 (Aug. 2, 2002) published online Jun. 20, 2002).
Li, Zili, et al., "14.3: Photovoltaic Cell Integrated into a Reflective LCD," Society for Information Display Symposium Digest of Technical Papers, vol. 33, No. 1, pp. 190-193 (May 2002) (Abstract only).
Nguyen-Huu, Nghia, et al., "Color filters featuring high transmission efficiency and broad bandwidth based on resonant waveguide-metallic grating," Optics Communications, vol. 284, No. 10-11, pp. 2473-2479 (May 15, 2011) (Abstract only).
Shen, J.T., et al., "Mechanism for Designing Metallic Metamaterials with a High Index of Refraction," Physical Review Letters, vol. 94, No. 19, pp. 197401-1-197401-4 (May 17, 2005).
Thio, Tineke, et al., "Enhanced light transmission through a single subwavelength aperture," Optics Letters, vol. 26, No. 24, pp. 1972-1974 (2001) (Abstract only).
Wang, Yu, "Liquid crystal display efficiency enhancement using low-absorption color filters and color recyling," http://trs-new.jpl.nasa.gov/dspace/bitstream/2014/16461/1/00-2514.pdf (downloaded on May 13, 2013).
Wu, Yi-Kuei Ryan, et al., "Angle-Insensitive Structural Colours based on Metallic Nanocavities and Coloured Pixels beyond the Diffraction Limit," Scientific Reports, vol. 3, No. 1194, pp. 1-6 (Feb. 1, 2013).

(56) References Cited

OTHER PUBLICATIONS

Xu, Ting, et al., "Plasmonic nanoresonators for high-resolution colour filtering and spectral imaging," Nature Communications, vol. 1, p. 1058 (Aug. 24, 2010).
Xue, Yinfei, et al., "Compound polarized wavelength filters with a single subwavelength structure," Optics Communications, vol. 284, No. 1, pp. 501-509 (Jan. 1, 2011) (Abstract only).
Ye, Yan, et al., "Color filter based on a submicrometer cascaded grating," Optics Communications, vol. 283, No. 4, pp. 513-616 (Feb. 15, 2010) (Abstract only).
Ye, Yan, et al., "Polarizing color filter based on a subwavelength metal-dielectric grating," Applied Optics, vol. 50, No. 10, pp. 1356-1363 (Apr. 1, 2011) (Abstract only).
Yoon, Yeo-Taek, et al., "Color filter incorporating a subwavelength patterned grating in poly silicon," Optics Express, vol. 16, No. 4, pp. 2374-2380 (Feb. 18, 2008) (published online Feb. 5, 2008).
International Search Report and Written Opinion of the International Searching Authority issued on Dec. 21, 2011 or PCT International Application No. PCT/US2011/034174 (Pub. No. WO 2011/139785).
International Preliminary Report on Patentability issued on Oct. 30, 2012 for PCT International Application No. PCT/US2011/034174 (Pub. No. WO 2011/139785).
International Search Report and Written Opinion of the International Searching Authority issued on Nov. 28, 2012 for PCT International Application No. PCT/US2012/034526 (Pub. No. WO 2012/145677).
International Preliminary Report on Patentability issued on Oct. 22, 2013 for PCT International Application No. PCT/US2012/034526 (Pub. No. WO 2012/145677).
Xu et al., Nanostructured metal-insulator-metal resonators for high-resolution color filtering and spectral imaging, SPIE vol. 7946, published Feb. 28, 2011.
First Office Action and Search Report issued by the Patent Office of the People's Republic of China on Jun. 3, 2014 for Chinese Patent Application No. 201180021224.5, translation provided by Unitalen.
Office Action issued on Jan. 22, 2015 in Japanese Application No. 2013-508221, translation provided by Asamura Patent Office.
R. Ortuno et al., "Midinfrared filters based on extraordinary optical transmission through subwavelength structured gold films", J. Appl. Phys., 2009, vol. 106, pp. 124313-1-124313-6.
Second Office Action issued on Feb. 25, 2015 for Chinese Application No. 201180021224.5, translation provided by Unitalen.
Wu, Yi-Kuei Engineering Micro- and Nanoscale Cavities for Applications in Light Manipulation (Unpublished doctoral dissertation). University of Michigan, Ann Arbor, Michigan (2013).
Supplementary European Search Report issued on May 26, 2015 in European Application No. 12773766.6.
Honda, Tohru, et al., "Fabrication of a ZnSe-Based Vertical Fabry-Perot Cavity Using SiO2/TiO2 Multilayer Reflectors and Resonant Emission Characteristics," Jpn. J. Appl. Phys., vol. 33, pp. 3960-3961 (Jul. 1994).
Yoon, Yeo-Taek, et al., "Transmission Type Color Filter Incorporating a Silver Film Based Etalon," Optics Express, vol. 18, No. 5, pp. 5344-5349, Mar. 1, 2010.
Patel, J.S., et al., "Electrically Tunable Optical Filter for Infrared Wavelength Using Liquid Crystals in a Fabry-Perot Etalon," Appl. Phys. Lett., vol. 57, No. 17, pp. 1718-1720, Oct. 22, 1990.
Zhang et al., "Novel Tunable Liquid Crystal Fabry-Perot Filters for Fiber-Optical Systems," Prog. SPIE. 0277 (2001).
Kaplan et al, "High Efficiency Resonance-Based Color Filters with Tunable Transmission Bandwidth Fabricated Using Nanoimprint Lithography," Appl. Phys. Lett. 99, 143111, 2011.
Sinclair, Douglas, "Scanning Spherical-Mirror Interferometers for the Analysis of Laser Mode Structures," Spectra-Physics Laser Technical Bulletin No. 6, pp. 1-8, Apr. 1968.
Liang, et al., "Design of Incident Angle-Independent Color Filter based on Subwavelength Two-Dimensional Gratings," Acta Phys. Sin., vol. 62(6), pp. 64204-1-64204-6 (2013).
Chung, et al., "Color filters for Reflective Display with Wide Viewing Angle and High Reflectivity based on Metal Dielectric Multilayer," Applied Physics Letters, vol. 101, pp. 221120-1-221120-4 (2012).

\* cited by examiner

DYE AND PIGMENT-FREE STRUCTURAL COLORS AND ANGLE-INSENSITIVE SPECTRUM FILTERS

CROSS-REFERENCE TO RELATED APPLICATIONS

This application claims the benefit of U.S. Provisional Application No. 61/793,559, filed on Mar. 15, 2013. The entire disclosure of the above application is incorporated herein by reference.

GOVERNMENT RIGHTS

This invention was made with government support under ECCS1202046 awarded by the National Science Foundation. This invention was developed under Contract DE-AC04-94AL85000 between Sandia Corporation and the U.S. Department of Energy. The U.S. Government has certain rights in this invention.

FIELD

The present disclosure relates to optical spectrum filters, which provide a filtered electromagnetic spectrum that is angle insensitive or independent to varied angles of incident light and thus independent of viewing direction.

BACKGROUND

This section provides background information related to the present disclosure which is not necessarily prior art.

Electromagnetic spectrum filters, such as color filters, are an important component for various display technologies, including flat panel displays, liquid crystal displays, projection displays, eye-wear displays, complementary metal-oxide-semiconductor (CMOS) image sensors, light emitting diodes, and the like. For example, transmission-type optical spectrum filters are widely utilized in applications such as liquid crystal display (LCD) panels. Conventional optical filters use pigment dispersions to produce red-green-blue (RGB) colors by absorbing complementary colors. Colored pigments also form the basis for most of the colored prints widely used in the printing industry.

However, such conventional optical pigment-based filters and colored print are manufactured by four separate processes, which not only complicates the manufacturing process and increases cost, but also wastes significant chemical materials in the process. For display and imaging applications, while Fabry-Perot based etalon color filters have been proposed, the conventional Fabry-Perot based filter still presents issues regarding undesirable angle dependence, meaning that the filtered light wavelength exiting the filtering device suffers from a significant shift of wavelength and therefore color shift, depending upon the viewing angle. Such angle dependence is undesirable in various imaging and display applications.

Accordingly, there is a need for a new spectrum filter technology, like a color filter, that can produce optical filters in the visible or near infrared range, for example, with high transmission efficiency and with minimal angle dependence, as well as reduced manufacturing complexity.

SUMMARY

This section provides a general summary of the disclosure, and is not a comprehensive disclosure of its full scope or all of its features.

In various aspects, the present disclosure provides optical spectrum filtering devices displaying minimal angle dependence or angle insensitivity. In one variation, the disclosure provides an angle insensitive optical spectrum filtering device comprising a localized plasmonic nanoresonator assembly. The localized plasmonic nanoresonator assembly comprises a metal material layer defining at least one nanogroove and a dielectric material disposed adjacent to the metal material layer. The dielectric material is also disposed within the at least one nanogroove defined by the metal material layer. The localized plasmonic nanoresonator assembly is configured to funnel and absorb a portion of an electromagnetic spectrum in the at least one nanogroove via localized plasmonic resonance to generate a filtered output having a predetermined range of wavelengths that displays angle insensitivity.

In other aspects, the present disclosure provides another variation of an angle insensitive optical spectrum filtering device. The angle insensitive optical spectrum filtering device is a reflection-type filter that comprises a localized plasmonic nanoresonator assembly. The localized plasmonic nanoresonator assembly comprises a metal material layer defining at least one nanogroove and a dielectric material disposed adjacent to the metal material layer. The dielectric material is also disposed within the at least one nanogroove defined by the metal material layer. The localized plasmonic nanoresonator assembly is configured to funnel and absorb a portion of an electromagnetic spectrum in the at least one nanogroove via localized plasmonic resonance to reflect a filtered output having a predetermined range of wavelengths that displays angle insensitivity. By displaying angle insensitivity, the predetermined range of wavelengths varies less than or equal to about 20 nm from an incidence angle of 0 to an incidence angle of 90° with respect to the reflective filtering device.

In yet other aspects, a transmission-type angle insensitive optical spectrum filtering device is provided that comprises a localized plasmonic nanoresonator assembly comprising a metal material layer defining at least one nanogroove. The localized plasmonic nanoresonator assembly also comprises a dielectric material disposed adjacent to the metal material layer and disposed within the at least one nanogroove. The localized plasmonic nanoresonator assembly is configured to funnel and absorb a portion of an electromagnetic spectrum in the at least one nanogroove via localized plasmonic resonance to transmit a filtered output having a predetermined range of wavelengths. The filtered output displays angle insensitivity, so that the predetermined range of wavelengths varies less than or equal to about 20 nm from an incidence angle of 0 to an incidence angle of 90° with respect to the filtering device.

In yet other aspects, the present disclosure contemplates a pixel for a display device. The display pixel comprises a color filtering device. The color filtering device comprises a localized plasmonic nanoresonator assembly, which comprises a metal material layer defining at least one nanogroove and a dielectric material disposed adjacent to the metal material layer. The dielectric material is disposed within the at least one nanogroove defined by the metal material layer. The localized plasmonic nanoresonator assembly is configured to funnel and absorb a portion of a visible light spectrum in the at least one nanogroove via localized plasmonic resonance to generate a filtered output having a predetermined range of wavelengths in a visible light range that displays minimal angle dependence or angle insensitivity. Such angle insensitivity means that the predetermined range of wavelengths varies by less than or equal to 20 nm at incidence angles ranging from 0 to 90° with respect to the color filter device. In other variations, the color filter device may include a plurality of distinct nanogrooves that are sized to generate distinct filtered outputs and thus, distinct colors. Such a color filter device thus forms a multi-colored display pixel for a display device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1E:
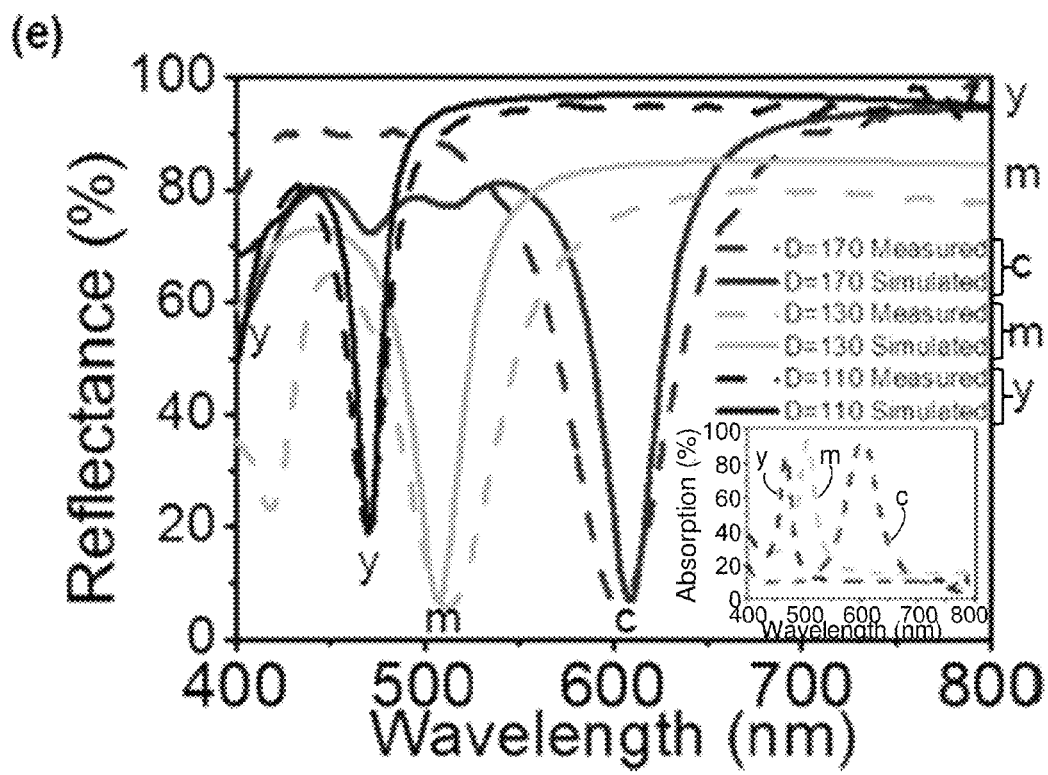
Figure 1F:
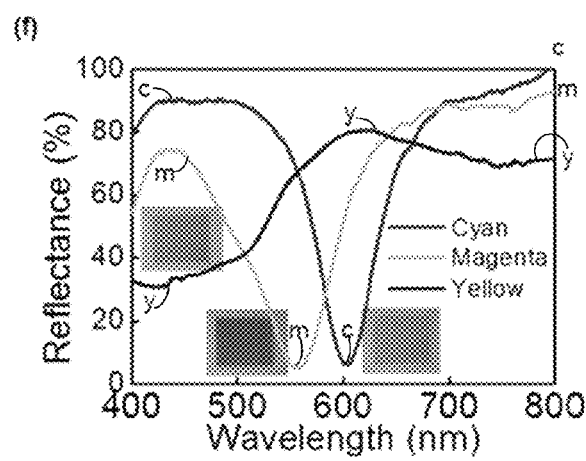

FIGS. 1(a)-1(f). FIG. 1(a) shows an exemplary optical spectrum filtering device comprising a localized plasmonic nanoresonator assembly prepared in accordance with certain aspects of the present teachings in a sectional perspective view. FIG. 1(b) shows a corresponding SEM image of a fabricated device as in FIG. 1(a) having a metal material layer of silver and a dielectric material of fused silicon dioxide, where the localized plasmonic nanoresonator assembly comprises a plurality of nanogrooves having a width (W) of 45 nm, a depth (D) of 160 nm, and a period (P) of 180 nm, with θ as the incident angle of light. FIG. 1(c) shows polarization charge and Poynting vector distribution of light funneled into these nanogrooves, presented with the red-blue surface plot (±, where red is "+" and blue is "−") and arrows, respectively. FIG. 1(d) shows intensity distribution of a magnetic-field $H_y$ at resonance, where period (P) is 180 nm, width (W) is 50 nm and depth (D) is 170 nm. FIG. 1(e) shows reflection (simulated in solid lines and measured in dashed lines) and measured absorption spectra (inset, dashed lines) at depths (D) of 110 nm to generate yellow filtered output, 130 nm to generate magenta filtered output, and 170 nm to generate cyan filtered output, given a fixed period (P) between nanogrooves of 180 nm and a fixed nanogroove width of 50 nm at normal incidence. FIG. 1(f) shows reflection spectra at fixed periods between nanogrooves (P=180 nm) and fixed depths (D=170 nm) but with varied widths (W=40 nm, 60 nm, and 90 nm), demonstrating the three basic colors of the CMY color model, cyan (C), magenta (M), and yellow (Y) at normal incidence of electromagnetic radiation.

Figures 2A, 2B, 2C, 2D, 2E, 2F:
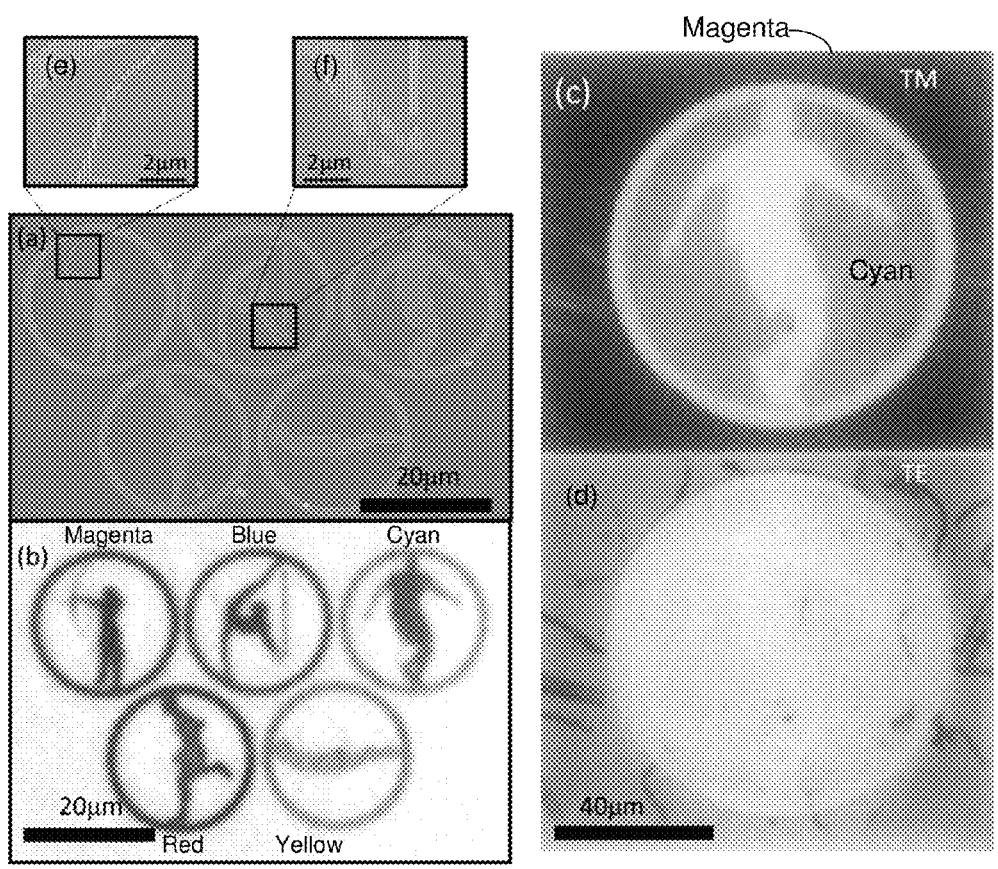

FIGS. 2(a)-2(f) show color demonstrations with ultrahigh resolution and polarization dependent images by using an optical spectrum filtering device comprising a localized plasmonic nanoresonator assembly prepared in accordance with certain aspects of the present teachings. FIG. 2(a) is an SEM image of a localized plasmonic nanoresonator assembly comprising a plurality of nanogrooves that form a pattern of Olympic rings. FIG. 2(b) is an optical image under white light illumination showing reflection of colored images in the format of the Olympic rings. The full range of CMY colors are achieved by sweeping nanogroove width (W) from 40 nm to 90 nm, with a fixed period between nanogrooves (P=180 nm) and a fixed nanogroove depth (D=170 nm). FIG. 2(b) also shows that even a single short segmented nanogroove exhibits color filtering response. FIGS. 2(c) and 2(d) utilize polarization dependence to actively change an image displayed, where the image is generated by a filtering device according to the present disclosure comprising a localized plasmonic nanoresonator assembly comprising a plurality of nanogrooves that form a pattern of one ring where the nanogrooves have a width of 40 nm in certain regions to generate cyan color and a width of 60 nm to generate a magenta color in other regions. In FIG. 2(c), the illumination under transverse magnetic (TM) polarized incident light exhibits cyan and magenta colors, while in FIG. 2(d) illumination by transverse electric (TE) polarized light shows no color generation. FIGS. 2(e) and 2(f) are insets showing detailed regions of the SEM image of FIG. 2(a).

Figures 3A, 3B, 3C, 3D, 3E:
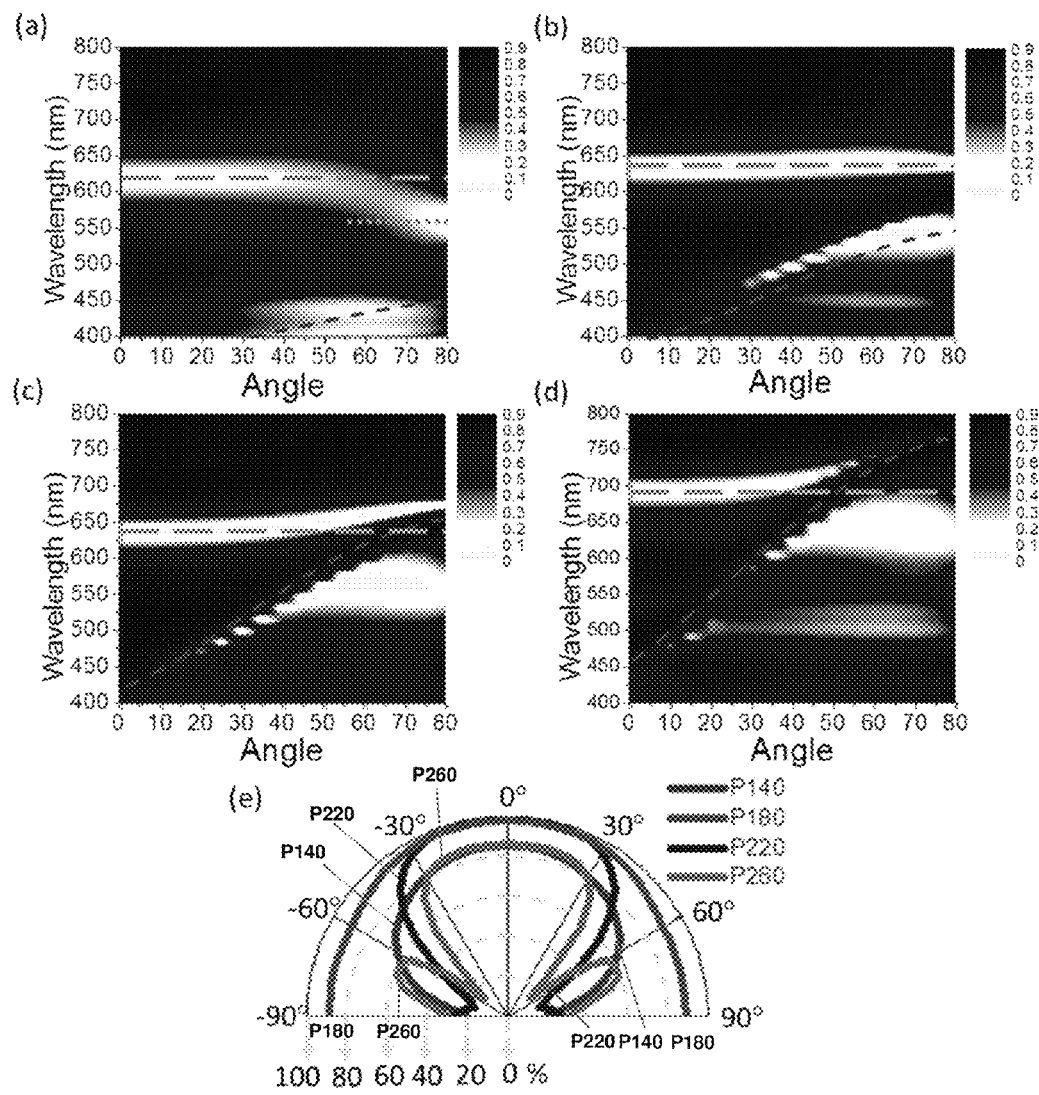

FIGS. 3(a)-3(e) show simulated angle resolved reflection spectra with localized plasmonic nanoresonator assembly nanogrooves having different periodicity. For each localized plasmonic nanoresonator assembly structure, a width of each nanogroove is fixed at 50 nm and diameter of each nanogroove is fixed at 180 nm. In FIG. 3(a), the period between nanogrooves is 140 nm, in FIG. 3(b), the period between nanogrooves is 180 nm, in FIG. 3(c), the period between nanogrooves is 220 nm, and in FIG. 3(d), the period between nanogrooves is 260 nm. Thus, the simulated angle resolved reflection spectra contour plots at periods of P=140 nm (FIG. 3(a)), 180 nm (FIG. 3(b)), 220 nm (FIG. 3(c)), and 260 nm (FIG. 3(d)) are shown. The straight green dashed lines in FIGS. 3(a)-3(d) indicate metal-insulator-metal Fabry-Perot (MIMFP) cavity mode, whereas the curved red dashed lines refer to the grating assisted surface plasmon (GASP) modes, whose dispersion is dependent on the grating period. The crossing between MIMFP and GASP when P=220 nm and 260 nm in FIGS. 3(c) and 3(d) indicates coupling between the two modes. The green straight dashed line in FIG. 3(a) refers to the dispersion of odd mode defined in FIG. 5(c). FIG. 3(e) shows simulated angular absorption maxima of localized plasmonic nanoresonator assembly nanogrooves having different periodicity (140 nm, 180 nm, 220 nm, and 260 nm).

Figures 4A, 4B, 4C:
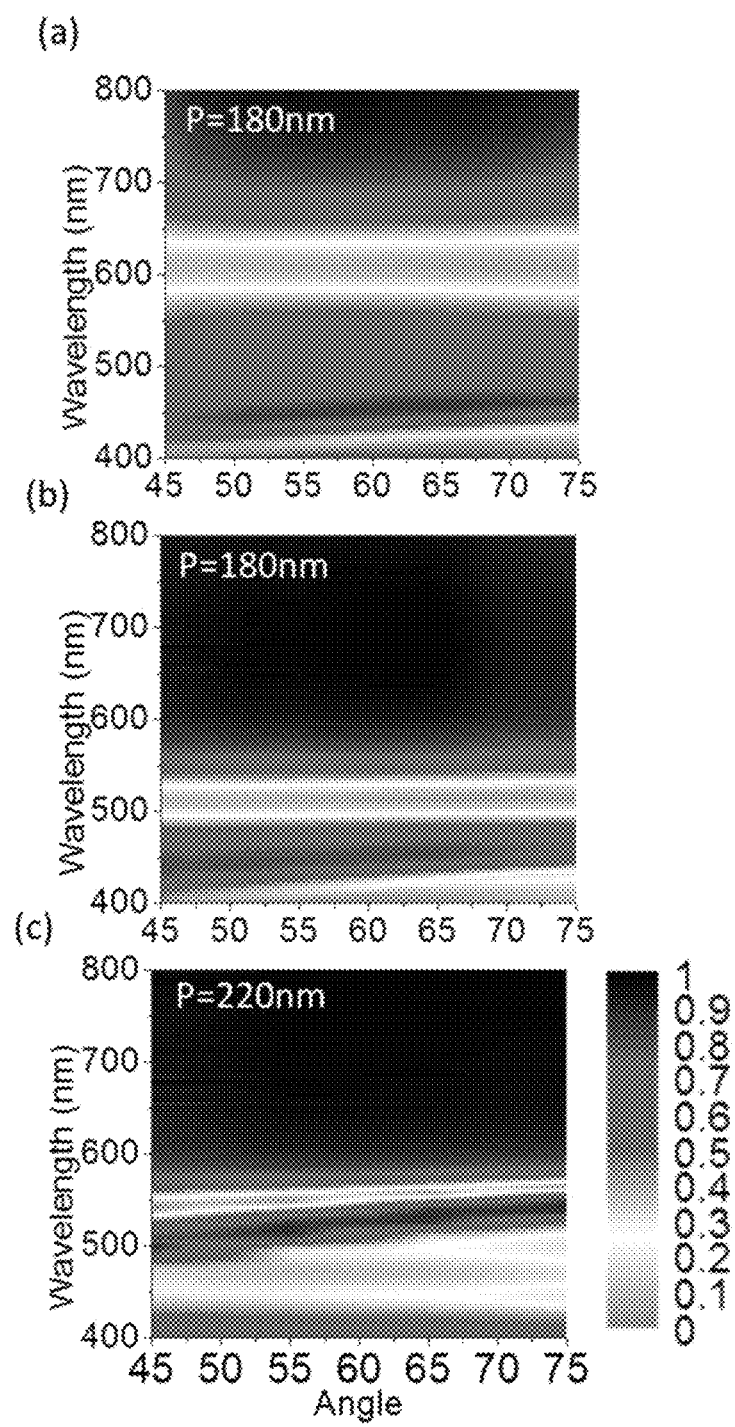

FIGS. 4(a)-4(c) show experimental angle insensitive spectrum filtering for localized plasmonic nanoresonator assemblies according to certain aspects of the present disclosure. FIG. 4(a) shows angle resolved reflection spectra of a localized plasmonic nanoresonator assembly design, where nanogrooves have a period (P) of 180 nm, a width (W) of 50 nm, and a depth (D) of 130 nm. FIG. 4(b) shows angle resolved reflection spectra of a localized plasmonic nanoresonator assembly design, where nanogrooves have a period (P) of 180 nm, a width (W) of 50 nm, and a depth (D) of 170 nm. FIG. 4(c) shows angle resolved reflection spectra of a localized plasmonic nanoresonator assembly design, where nanogrooves have a period (P) of 220 nm, a width (W) of 50 nm, and a depth (D) of 160 nm. FIGS. 4(a)-4(c) show sweeping incident illumination angles from 45° to 75° with respect to the filtering device. FIGS. 4(a) and 4(b) show flat band absorption response indicating angle insensitivity, while FIG. 4(c) shows 25 nm resonance wavelength shift per 30° change in incident illumination angle representing undesirable coupling between MIMFP and GASP modes.

Figures 5A, 5B, 5C, 5D, 5E, 5F:
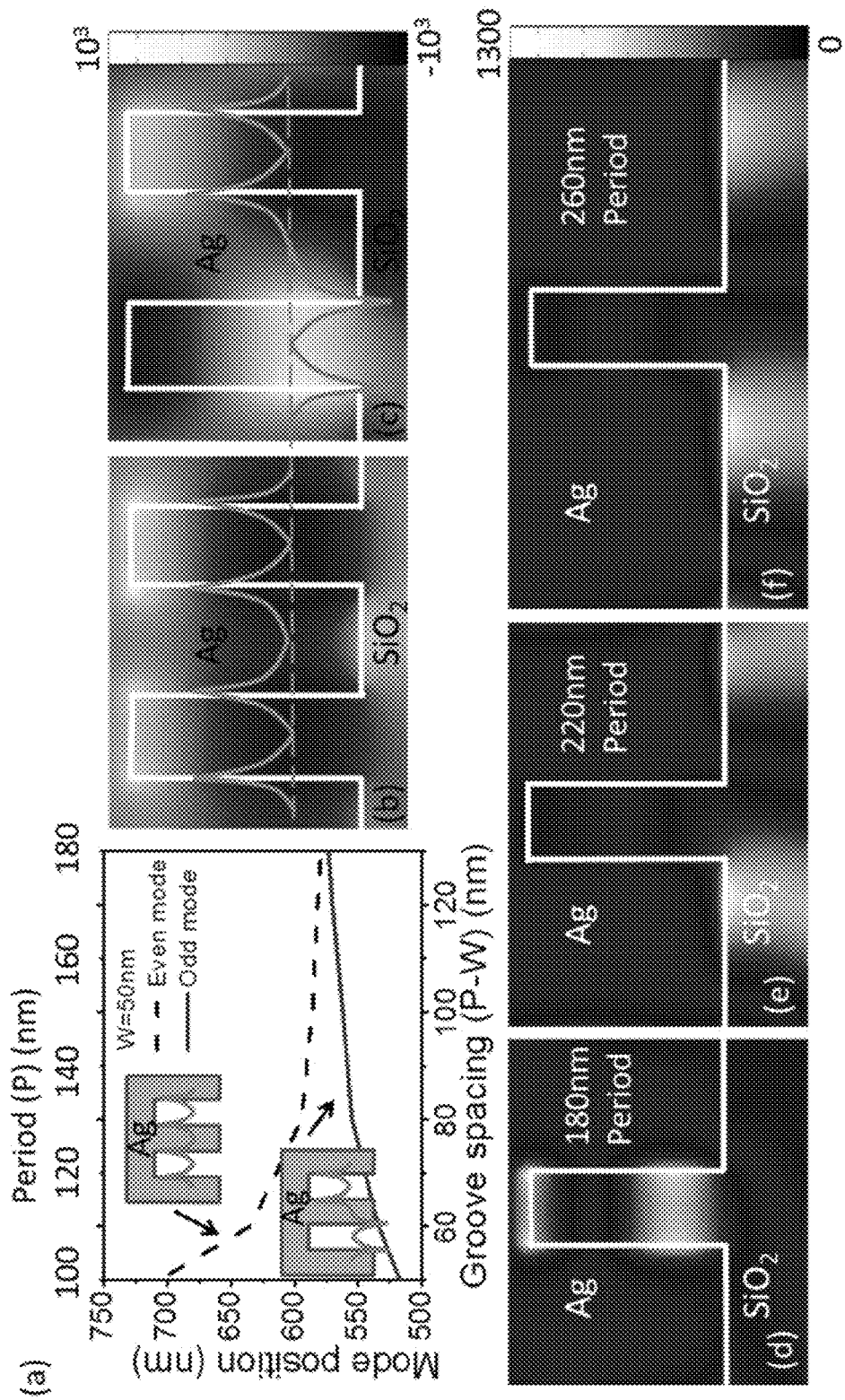

FIGS. 5(a)-5(f) show optical mode coupling and period dependent field confinement for localized plasmonic nanoresonator assemblies. FIG. 5(a) shows mode dispersion with respect to the nanogroove spacing (P−W) and period, as well as the definition of even and odd modes in the insets. The field distribution of $H_y$ with defined even and odd modes is plotted in FIGS. 5(b) and 5(c), respectively. The intensity distribution of magnetic field $H_y$ at the incident illumination angle of 45° is presented at period P=180 nm (FIG. 5(d)), 220 nm (FIG. 5(e)), and 260 nm (FIG. 5(f)). FIG. 5(d) confirms that the field is well confined within the nanogroove corresponding to a MIMFP mode, while FIGS. 5(d) and 5(f) show strong surface modes illustrating coupling to the GASP modes.

Figure 6:
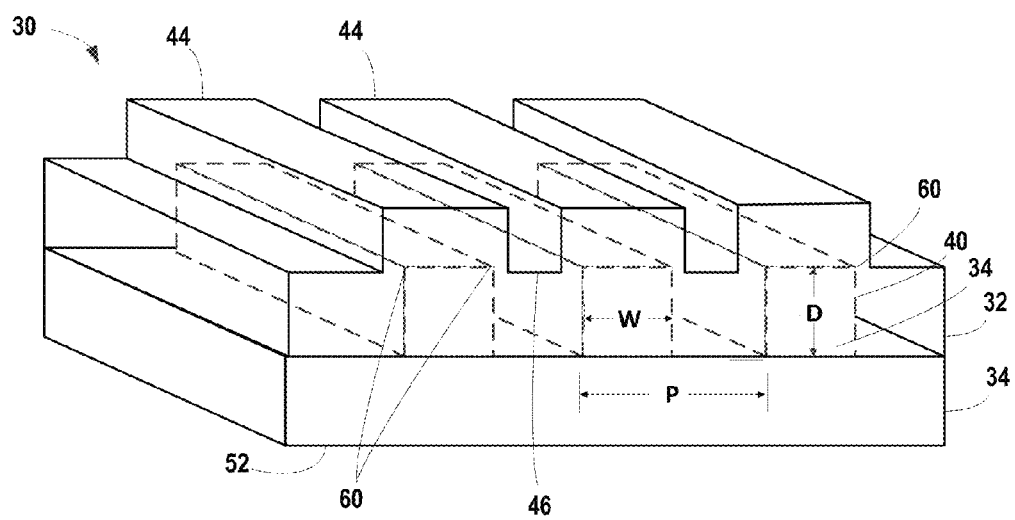

FIG. 6 shows a schematic of dimensions of an exemplary optical spectrum filtering device comprising a localized plasmonic nanoresonator assembly comprising a plurality of nanogrooves disposed in parallel to one another prepared in accordance with certain aspects of the present teachings, like in FIG. 1(a).

Figures 7A, 7B, 7C, 7D:
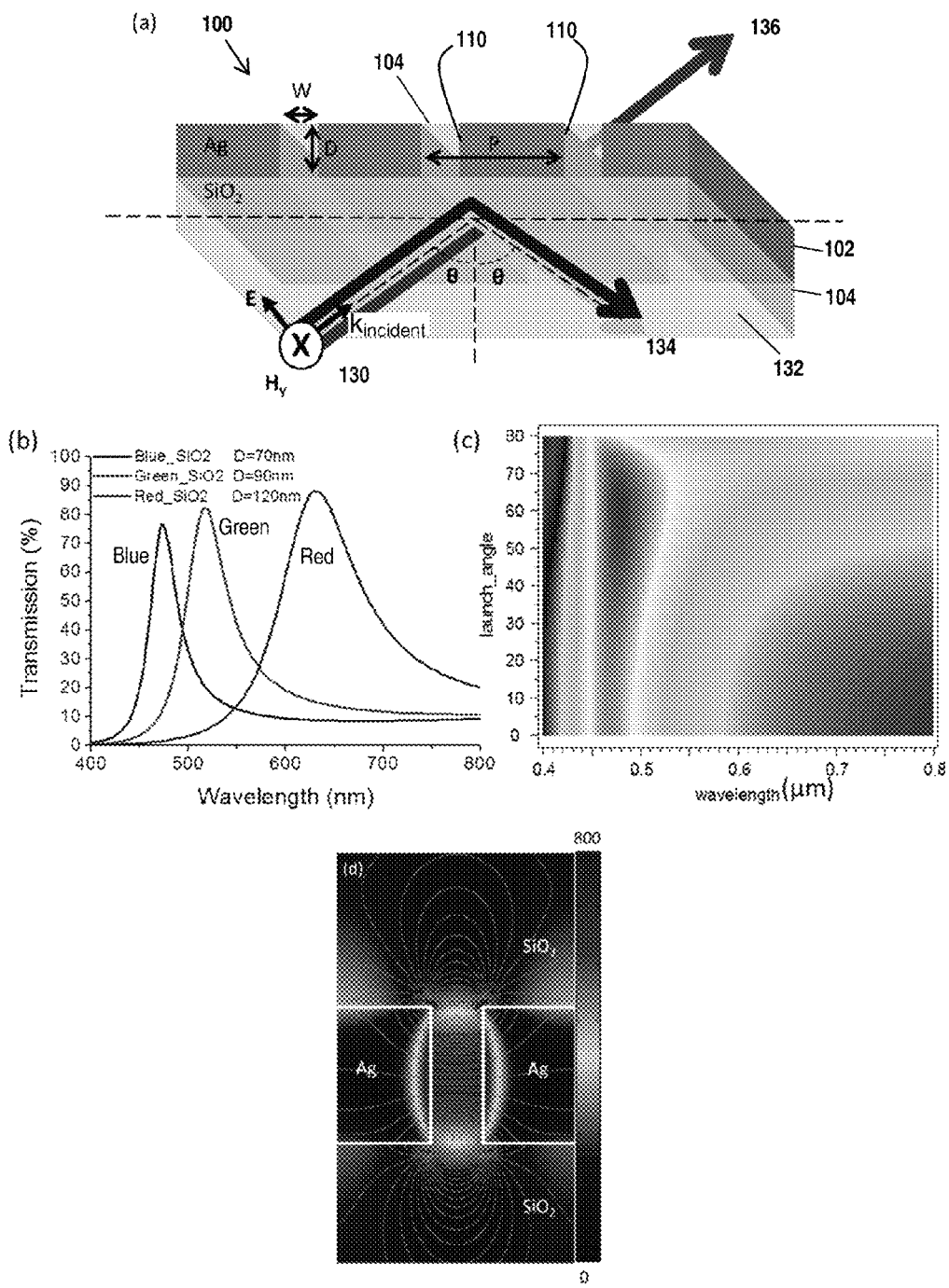

FIGS. 7(a)-7(d). FIG. 7(a) shows an exemplary transmissive type optical spectrum filtering device comprising a localized plasmonic nanoresonator assembly having a plurality of nanogrooves prepared in accordance with certain aspects of the present teachings in a sectional perspective view. FIG. 7(b) shows spectra for blue, green, and red color with various nanogroove heights ranging from 70-120 nm. FIG. 7(c) shows simulated angle resolved spectrum for a blue color filter, and FIG. 7(d) shows magnetic (Hy) field intensity distribution at a resonance wavelength of 480 nm.

Figures 8A, 8B:
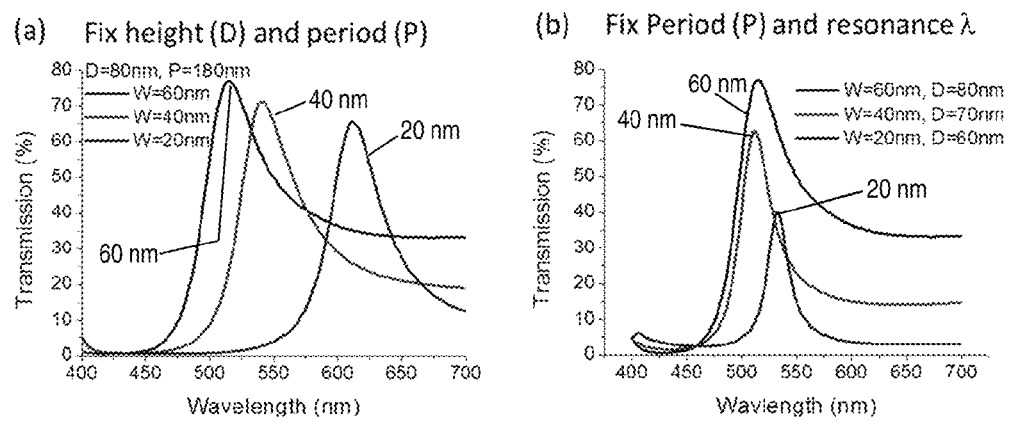
Figures 8C, 8D:
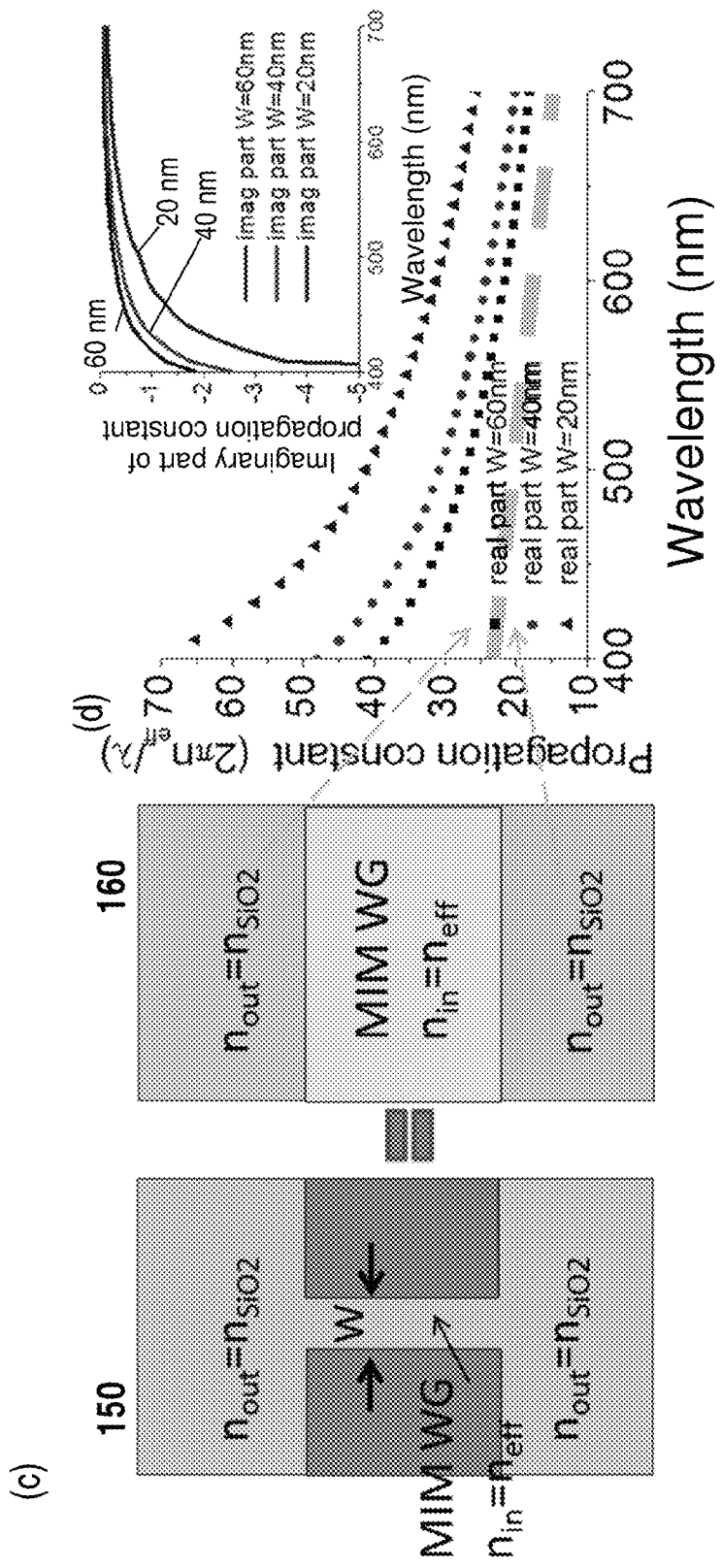

FIGS. 8(a)-8(d). FIG. 8(a) shows transmission spectra for blue, green, and red colors for an exemplary transmission-type type optical spectrum filtering device comprising a localized plasmonic nanoresonator assembly having a plurality of nanogrooves with widths (W) ranging from 60 nm to 20 nm while having a fixed period and depth. FIG. 8(b) shows transmission spectra with various nanogroove widths (W) from 60 nm to 20 nm given resonance wavelength and fixed period (P) between nanogrooves. FIG. 8(c) shows equivalent Fabry-Perot model for a Metal-Insulator-Metal Fabry-Perot (MIMFP) cavity. FIG. 8(d) shows dispersion curves of the MIM waveguide (WG) at nanogroove widths of W=20 nm (in blue), 40 nm (in red), 60 nm (in black), and the dashed curve indicates the dispersion of the $n_{out}$. The inset shows the imaginary part of propagation constant, which indicates waveguide loss.

Figures 9A, 9B:
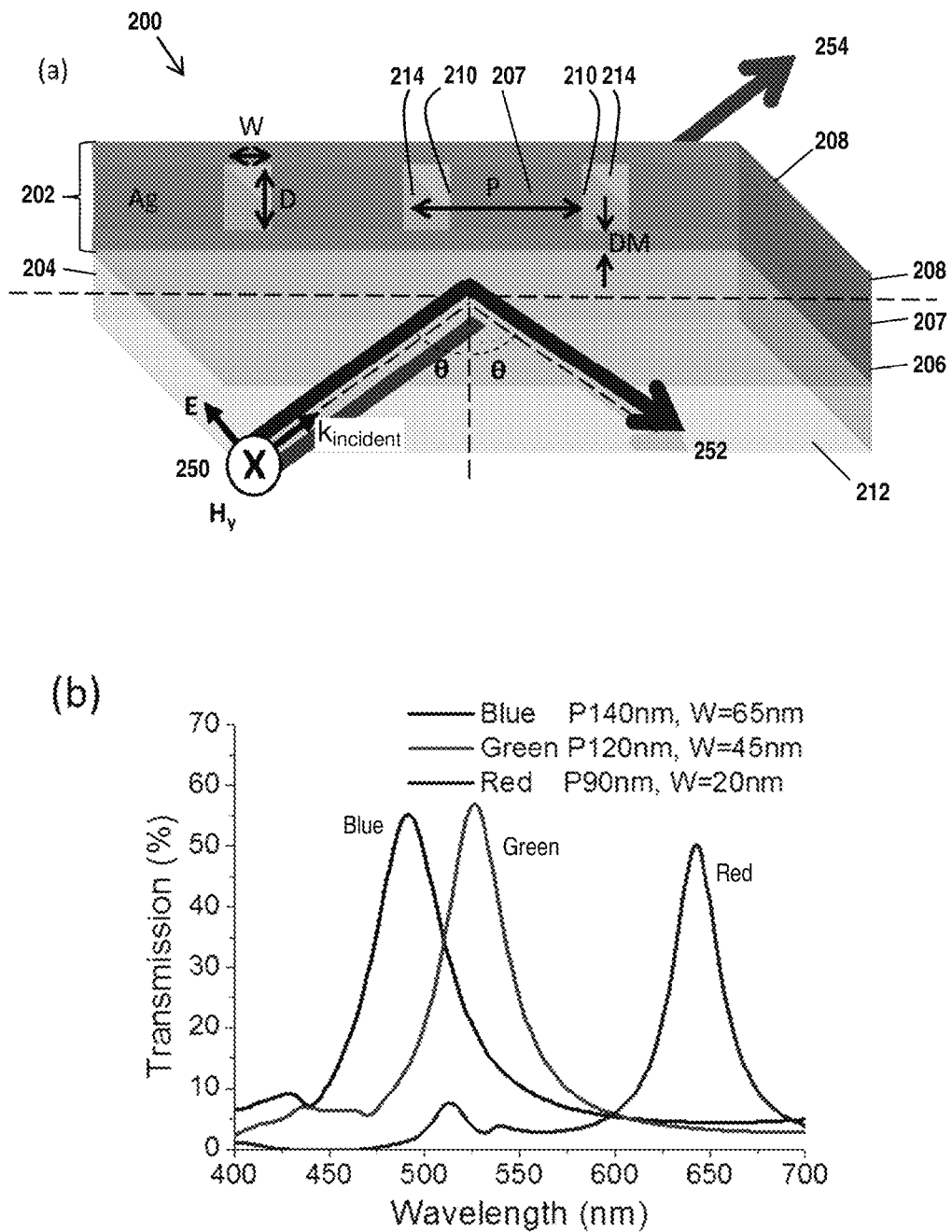

FIGS. 9(a)-9(b). FIG. 9(a) shows another variation of a transmissive type optical spectrum filtering device comprising a localized plasmonic nanoresonator assembly having a multi-layered metal material assembly defining a plurality of nanogrooves and a discontinuous dielectric material disposed therein prepared in accordance with certain aspects of the present teachings in a sectional perspective view. FIG. 9(b) shows optimized spectra for blue, green, and red colors at nanogroove depths D=90 nm and for reflective metal material layer thicknesses (DM)=20 nm.

Figure 10:
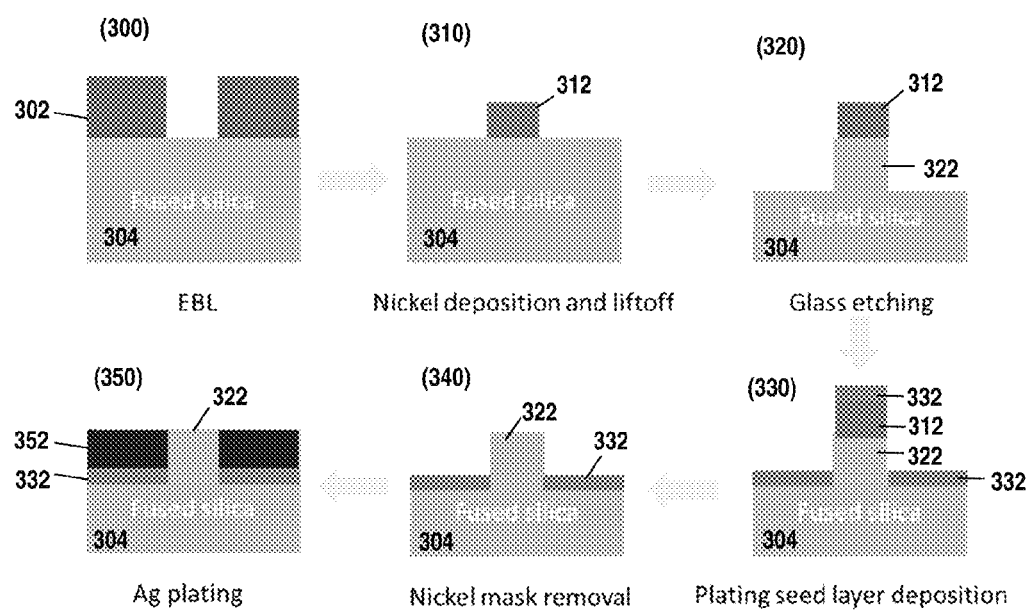

FIG. 10 illustrates an exemplary fabrication method for forming an exemplary transmission-type type optical spectrum filtering device in accordance with certain aspects of the present teachings.

Figures 11A, 11B:
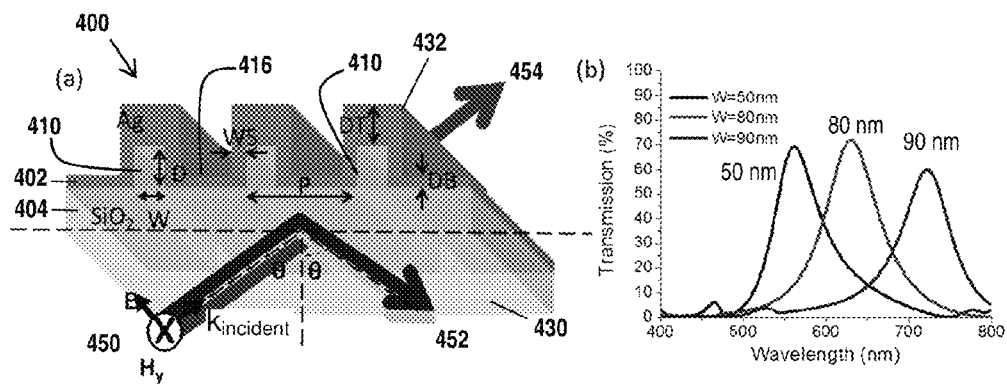

FIGS. 11(a)-11(b). FIG. 11(a) shows another variation of a low angle dependence coupled cavity transmission-type type optical spectrum filtering device comprising a localized plasmonic nanoresonator assembly comprising a metal material defining a plurality of nanogrooves and a dielectric material disposed therein prepared in accordance with certain aspects of the present disclosure. FIG. 11(b) shows simulated spectra for varying nanogroove widths (W) from 50 nm to 90 nm, where a metal material layer has a top thickness (DT)=60 nm, a bottom thickness (DB)=30 nm, a sidewall thickness (WS)=15 nm, a nanogroove depth (D)=100 nm, and a period between nanogrooves (P)=140 nm.

Figures 12A, 12B, 12C, 12D:
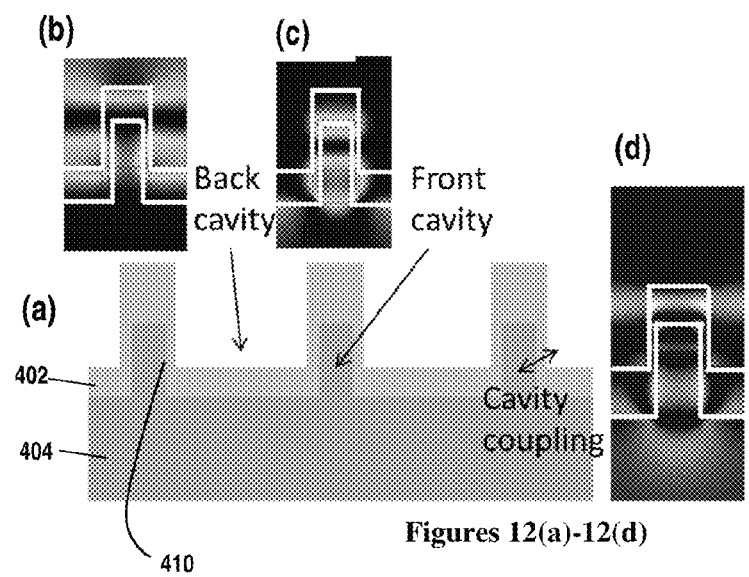

FIGS. 12(a)-12(d) show Hy field distribution for a low angle dependence coupled cavity transmission-type type optical spectrum filtering device like in FIG. 11(a). FIG. 12(a) shows an overall sectional schematic view, corresponding to Hy field distribution for back cavity (FIG. 12(b)), front cavity (FIG. 12(c)), and coupled modes (FIG. 12(d)).

Figure 13:
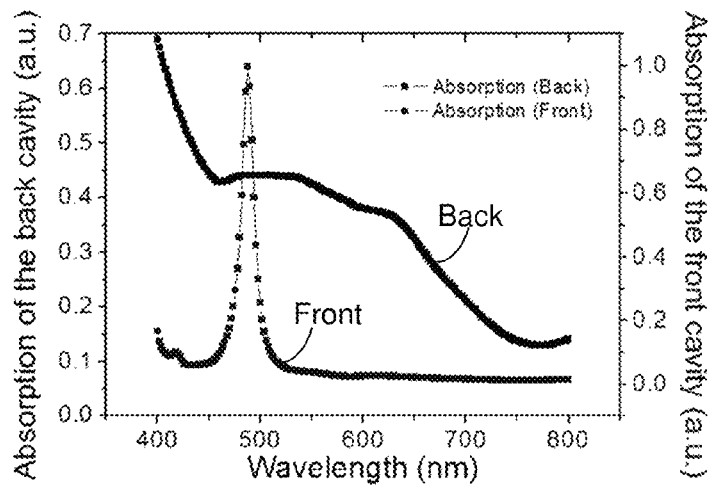

FIG. 13 shows absorption spectra of the front and back cavities mode spectra from back and front cavities in FIGS. 12(b)-12(c).

Figures 14A, 14B, 14C, 14D:
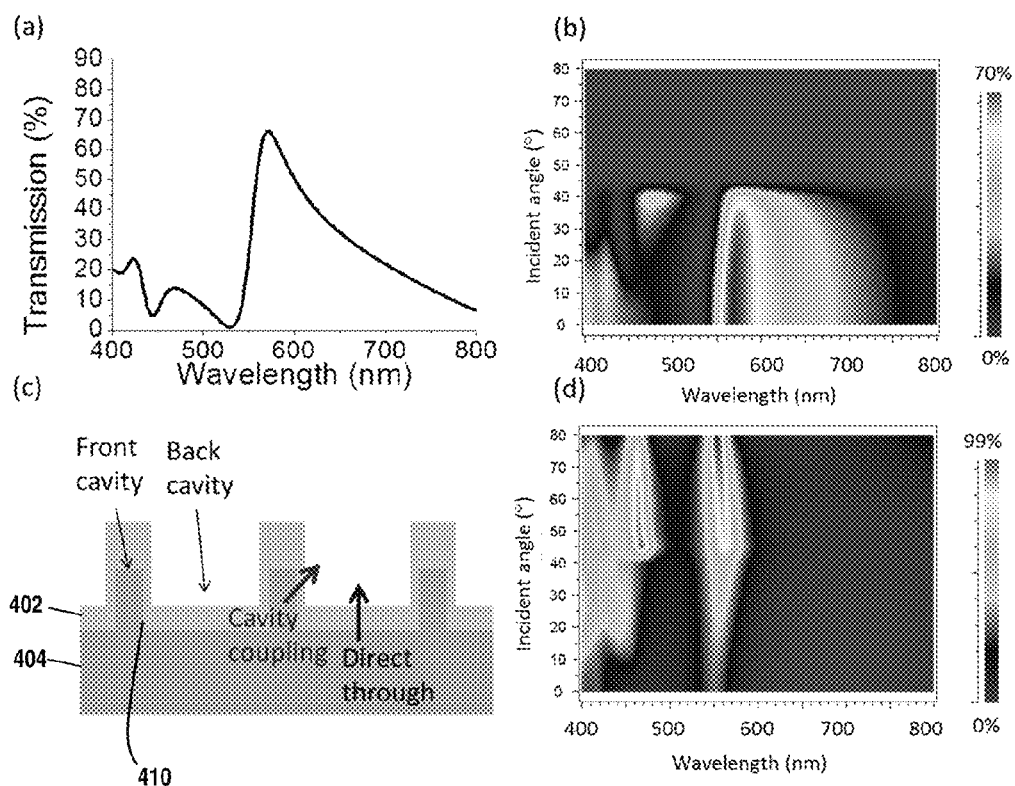

FIGS. 14(a)-14(d). FIG. 14(a) shows transmission resonance with Fano shape peak located at 576 nm for a cavity coupled spectrum filtering device like in FIGS. 11(a) and 12(a), where a bottom layer thickness (DB) is 30 nm at normal incidence. FIG. 14(b) shows transmission spectra with various angle swept from 0 to 80 degrees with a bottom metal thickness (DB) reduced from 50 nm to 30 nm. FIG. 14(c) is a schematic model of Fano resonance through filters having designs like the embodiments in FIGS. 11(a) and 12(a). FIG. 14(d) shows absorption spectra with various angles swept from 0 to 80 degrees.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints given for the ranges. Example embodiments will now be described more fully with reference to the accompanying drawings.

Structural color is an attractive replacement for colorant pigmentation employed by the current display technologies. Such chemical pigments are vulnerable to a variety of processing chemicals, cannot withstand constant illumination with strong light intensities, and require extensive multilayer processing to pattern individual pixels. Inspired by natural color filtering, as found in the wings of Morpho butterflies and the feathers of peacocks, many structural color designs have been developed based on photonic crystals and plasmonic nano-structures. Such nanostructure-based color filtering offers increased efficiencies, low power consumption, slim dimensions, and enhanced resolution. However, while photonic and plasmonic crystal-based structures have been considered as alternative color filters to colorant-based pigmentation display technologies, the inherent iridescence of these types of devices leads to drastic changes in color with different incident angles of light. Overcoming the inherent angle dependence is a key challenge to be addressed in order for such structural color based filters to be suitable for use in practical applications, especially for use as color filters for display technology. Therefore, improving incident angle tolerance for nanostructured color filters would be advantageous.

For certain plasmonic nanostructures, angle dependence is directly related to surface plasmon polariton (SPP) excitation via grating coupling. While using this approach has led to high coupling efficiencies, it is inherently angle-dependent due to momentum matching conditions. Thus, the ability to overcome this angle-dependent spectrum response is important to providing structural filters that can be integrated into various practical applications, such as high-resolution visual displays, miniature hyperspectral imaging, and high sensitivity sensors, among others.

In accordance with certain aspects of the present disclosure, to obtain angle-insensitivity, the device structures are designed so as not to rely on surface plasmon modes, such as grating coupling for plasmonic mode excitation or surface plasmon polariton (SPP) excitation. Rather, in accordance with certain aspects of the present disclosure, plasmonic based resonator assemblies are employed as structural color filters that are configured to funnel and absorb a portion of an electromagnetic spectrum via localized plasmonic resonance to generate a filtered output having a predetermined range of wavelengths that displays minimal angle dependence.

Thus, in various aspects, the inventive technology provides filtering devices that employ localized resonance by funneling of portions of electromagnetic radiation or light into metallic nanogrooves formed within the localized plasmonic nanoresonator assembly of a filtering device. Furthermore, in various aspects, such plasmonic based resonator assembly structures are concurrently designed to suppress surface plasmon modes. In certain variations, angle insensitive color filters up to at least ±80 degrees are achieved, capable of wide color tunability across the entire band of visible light having a pixel size beyond the diffraction limit (about $\lambda/2$). In accordance with various aspects of the present disclosure, angle insensitive manipulation of light with structural filtering is possible.

The disclosure thus provides an optical spectrum filtering device comprising a localized plasmonic nanoresonator assembly that exhibits minimal angle dependence or is angle insensitive. The localized plasmonic nanoresonator assembly comprises a metal material layer defining at least one nanogroove. In certain variations, the metal material layer may be a multi-layered metal assembly. A dielectric material is disposed adjacent to the metal material layer. The dielectric material is also disposed within (e.g., embedded within) the at least one nanogroove defined by the metal material layer. The localized plasmonic nanoresonator assembly is configured to funnel and absorb a portion of an electromagnetic spectrum in the at least one nanogroove via localized plasmonic resonance to generate a filtered output having a predetermined range of wavelengths that displays minimal angle dependence. As will be discussed in greater detail below, the localized plasmonic nanoresonator assembly is also desirably configured to suppress or eliminate generation of surface plasmon modes, such as grating assisted surface plasmon (GASP) modes, when the assembly is exposed to incident electromagnetic radiation.

Particularly suitable visible and infrared electromagnetic radiation includes visible light having wavelengths ranging from about 390 to about 750 nm and infrared radiation (IR) (including near infrared (NIR) ranging from about 0.75 to about 1.4 µm). Filtered electromagnetic radiation can have a wavelength in a range of about 625 nm to 740 nm for red; about 590 nm to about 625 nm for orange; about 565 nm to about 590 nm for yellow; about 520 nm to about 565 nm for green; about 500 nm to about 520 nm for blue or cyan; about 435 nm to about 500 nm for blue or indigo; and about 380 nm to about 435 nm for violet. Further, in certain aspects, the filtered light may be extra-spectral or a mixture of several different wavelengths. For example, magenta is an extra-spectral mixture of red (625 nm to 740 nm) and blue (435 nm to 500 nm) wavelengths.

In certain aspects, the filtering device is capable of transmitting a portion of an electromagnetic spectrum into one or more nanogrooves to generate a filtered output having a predetermined range of wavelengths that exits the filter device. By "nanogroove" it is meant that a channel is formed within a metallic material and thus defines a nanoscale groove structure that permits light of certain wavelength(s) and polarities to enter and funnel into the nanogroove. The depth and width of each groove formed in the metal material layer determines which wavelengths and polarities of light may pass and funnel into the nanogroove. A nanogroove has a width and/or depth with a dimension that is sub-wavelength. In certain variations, a nanogroove has at least one dimension that is less than 1 µm (1,000 nm), optionally less than or equal to about 500 nm, optionally less than or equal to about 400 nm, optionally less than or equal to about 300 nm, optionally less than or equal to about 250 nm, preferably less than or equal to about 200 nm. Thus, in certain variations, the nanogroove may have a width that is of a sub-wavelength distance from one side to the other (a distance of less than the sum of the decay length of the surface wave propagating inside the nanogroove). Similarly, the depth of the slit or nanogroove is important for determining the filtered light output wavelength.

As noted above, in certain variations, the nanogroove has a dielectric material disposed therein. Such nanogrooves provide optical spectrum filtering by localized plasmonic resonance, as opposed to other filtering mechanisms, such as surface plasmon excitation or surface plasmon polariton (SPP) excitation modes. In various aspects, one or more nanogrooves in the localized plasmonic nanoresonator assembly are sized to suppress formation of such surface plasmon modes. It should be noted that in certain aspects, the metal of the metal material may comprise a plurality of nanogrooves, the number and placement of which are not limited by those shown. Thus, a plurality of nanogrooves may be formed within the metal material to increase the vibrancy or intensity of the filtered light produced via localized plasmonic resonance. However, the distribution of such nanogrooves may be of regular intervals within the metal material or alternatively may be randomly distributed, as each nanogroove independently provides the desired mechanism of localized plasmonic resonance and therefore is not restricted in terms of distance or placement with respect to other nanogrooves to provide the desired filtering. These filtering device designs are thus based on thin film structures, which can simplify color filter fabrication.

In various aspects, one or more nanogrooves are sized to maximize funneling and absorption of certain portions of an electromagnetic spectrum to generate a desired filtered output wavelength, while concurrently suppressing formation of surface plasmon modes. Thus, in certain variations, the predetermined range of wavelengths of the filtered output that exits the filtering device is in a visible light range. The specific dimensions of the nanogroove depend upon the properties of the materials selected for the metal material layer and the dielectric material. In certain embodiment, the metal material layer can define a plurality of distinct nanogrooves disposed parallel to one another that have a periodicity of greater than or equal to about 160 nm to less than or equal to about 200 nm. Such nanogroove dimensions are particularly suitable for embodiments where a metal material layer comprising silver (Ag) and a dielectric material comprising fused silica ($SiO_2$). Similarly, in certain other variations, the predetermined range of wavelengths of the filtered output that exits the filtering device is in a visible light range and at least one nanogroove has a width of greater than or equal to about 40 nm to less than or equal to about 90 nm. In yet other variations, the predetermined range of wavelengths of the filtered output that exits the filtering device is in a visible light range and the at least one nanogroove has a depth of greater than or equal to about 110 nm to less than or equal to about 170 nm. Again, such nanogroove width and depth dimensions are particularly suitable for embodiments where a metal material layer comprises silver (Ag) and a dielectric material comprises fused silica ($SiO_2$).

The nanogroove dimensions provide optical spectrum filtering devices designed to transmit and/or reflect a predetermined range of wavelengths having a color selected from the group consisting of: cyan, yellow, magenta, red, green, blue, and combinations thereof. In certain other aspects, the present disclosure provides a reflection-type optical spectrum filtering device that comprises a localized plasmonic nanoresonator assembly that reflects the predetermined range of wavelengths with minimal or no angle dependence. In other variations, the present disclosure provides a transmission-type filtering device comprising a localized plasmonic nanoresonator assembly that transmits the predetermined range of wavelengths with minimal or no angle dependence.

Accordingly, the present disclosure contemplates in certain variations, a vertical plasmonic resonator array with specially designed periodicity to avoid variation in filtered light based on varying angles with respect to the filtering device. In such a design, light funneling into nanogrooves within the structure is exploited to generate strong absorption for transverse magnetic (TM) polarized incident light. Utilizing light funneling, extremely small physical dimensions have large scattering cross sections, and therefore possess plasmonic mode coupling having efficiencies comparable to that of a conventional filtering structure having grating coupling. In certain aspects, optical devices prepared in accordance with the present technology are angle robust and capable of achieving near-perfect absorption (e.g., as large as 96% in the visible spectrum). Moreover, wide color tunability throughout the entire visible spectrum and pixel size beyond the diffraction limit are provided. In certain aspects, the disclosure provides optical filter designs based on certain principles for angle-robust reflection (e.g., by using principles of angular response of the reflection spectra with respect to the periodicity of arrayed one-dimensional structures). Further, periodicity on field confinement within the nano-cavities is explored, which is useful for a variety of applications for angle robust field confinement and spectrum filtering.

Thus, disclosed herein is a new structure that produces spectrum filtering, such as color filtering, based on a localized or nanoscale photonic resonator mechanism, rather than optical absorption by colorant materials or by surface plasmon polariton (SPP) excitation via grating coupling. The structures contemplated by the present disclosure provide an ability to couple electromagnetic radiation via a light funneling process into localized photonic resonators and thus provide light filtering. In certain aspects, the present teachings provide an optical spectrum filtering device comprising a localized plasmonic resonator that generates a filtered electromagnetic energy output having minimal angle dependence and in certain aspects, which is entirely independent of a viewing angle. The optical filtering devices are capable of achieving angle-insensitive behavior due to the localized resonance provided in accordance with various aspects of the present teachings.

Both transmission and reflection color filtering can be achieved by filter devices prepared in accordance with the present teachings. Thus, in certain variations, the optical spectrum filtering device may be a transmission-type filter, while in other variations; the optical spectrum filtering device may be a reflection-type filter. In yet other variations, the optical spectrum filtering device concurrently exhibits both a transmission and reflection-type filter.

In various aspects, optical spectrum filtering devices according to the present teachings are particularly suitable for use as a color filter, for example, a pixel, for a display device. Optical filtering devices according to various aspects of the present disclosure can be incorporated as a pixel into any flat panel display, either transmission or reflection type, and are especially useful for high input power applications, such as in 3-D projection displays. Thus, the display pixel may comprise a color filtering device comprising a localized plasmonic nanoresonator assembly having a metal material layer defining at least one nanogroove and a dielectric material disposed adjacent to the metal material layer. The dielectric material is disposed within the at least one nanogroove defined by the metal material layer. The localized plasmonic nanoresonator assembly is configured to funnel and absorb a portion of a visible light spectrum in the at least one nanogroove via localized plasmonic resonance to generate a filtered output having a predetermined range of wavelengths in a visible light range that displays minimal angle dependence. The filtered output may thus exhibit angle insensitivity in certain variations, so that the predetermined range of wavelengths varies by less than or equal to 20 nm at incidence angles ranging from 0 to 90° with respect to the color filter device. In certain variations, the color filter device displays angle insensitivity. In other variations, the color filter device may include a plurality of distinct nanogrooves that are sized to generate distinct filtered outputs and thus, distinct colors. Such a color filter device thus forms a multi-colored display pixel for a display device.

In certain aspects, the localized plasmonic nanoresonator assembly is capable of reflecting or transmitting a portion of an electromagnetic spectrum into the dielectric material to generate a filtered output having a predetermined range of wavelengths that exits the filter assembly. Any non-transmitted light is mainly (with a very small portion of light absorbed by metal) reflected and therefore can be recycled. In certain aspects, the filtering occurs at least in part via a localized optical resonance process, where the light is funneled into one or more nanogrooves and strongly absorbed. The filtered output desirably displays minimal angle dependence, making it particularly advantageous for use as pixels in display devices, by way of non-limiting example. Such an optical spectrum filtering device filter is more energy efficient than traditional colorant based filters and furthermore can withstand high input optical power.

The predetermined range of wavelengths of the filtered output that exits the filtering device is in the visible light range and may have a color selected from the group consisting of: cyan, yellow, magenta, red, green, blue, and combinations thereof. In certain variations, the color filtering device may include a plurality of distinct nanogrooves that are sized to generate distinct filtered outputs and thus, distinct colors. Such a color filter device thus forms a multi-colored display pixel for a display device. Because colored pixels can be smaller than diffraction limit when prepared in accordance with the present teachings, a "superpixel" is contemplated that can be used to mix different colors in close proximity to one another. In certain variations, angle insensitive color filters up to ±80 degrees are achieved, capable of wide color tunability across the entire band of visible light having a pixel size beyond the diffraction limit (about $\lambda/2$).

In this regard, optical spectrum filtering devices having minimal angle dependence or angle insensitivity in accordance with the present disclosure are particularly suitable for a variety of display-based applications. The device designs are based on thin film structures, which can not only reduce angle dependence, but also simplify color filter manufacturing while also recycling reflected light to provide overall higher transmission efficiencies. Such an optical spectrum filtering device filter is more energy efficient than traditional colorant based filters and furthermore can withstand high input optical power.

Furthermore, because colored pixels may have smaller dimensions than the diffraction limit, multiple colored filters can be combined to form pixels having different colors. For example, such filtering devices may be used with any flat panel display, either transmission or reflection type, especially for high input power application, e.g., in 3D projection displays. For example, the filter devices may be used in liquid crystal displays (LCD); colored electronic book displays, mobile phones, tablets, monitors, or screens; long-lasting colored prints (eliminating the need for pigments and other chemicals); complementary metal-oxide-semiconductor (CMOS) image sensors, light emitting diodes, flexible displays; projection displays, imaging systems, and eyewear displays; and imaging systems. The optical spectrum filtering devices of the present technology may be particularly useful for anti-counterfeiting and cryptography.

In other variations, the optical filtering devices comprising the localized plasmonic nanoresonator assembly is used as a colorant instead of pigments to generate color, for example, in color printing processes and applications. Colored prints having long-lasting colors without requiring the use of pigments and/or chemicals are thus contemplated. In certain aspects, the optical filtering devices comprising the localized plasmonic nanoresonator assembly may be in the form of particles, used in lieu of pigments. In other aspects, the filtering devices comprising the localized plasmonic nanoresonator assembly can be produced on a planar surface, like conventional colored pixel arrays, but are not solely limited to red, green, blue (RGB) or cyan, magenta, yellow (CMY). The, the filtering devices can be used to produce high resolution colored prints. Color filters of the inventive technology can be particularly advantageous suitable for security documents and applications, as discussed below.

In certain variations and for optical frequency range, a metal material layer defining the one or more nanogrooves comprises a metal selected from the group consisting of: gold, aluminum, silver, copper, and combinations thereof. For longer wavelength ranges, e.g., THz, many other metals can be used as well, for example, platinum (Pt), nickel (Ni), chromium (Cr), or liquid metals such as mercury (Hg) or gallium-indium (Ga—In) eutectic. In certain variations, the metal material comprises silver. In other variations, the dielectric material can be selected from the group consisting of: silicon dioxide (SiO$_2$), aluminum oxide (Al$_2$O$_3$), silicon nitride (Si$_3$N$_4$), zinc selenide (ZnSe), zinc oxide (ZnO), zirconium oxide (ZrO$_2$), and titanium oxide (TiO$_2$) for optical frequency. For longer wavelength range, semiconducting material such as silicon (Si), germanium (Ge), and gallium arsenide (GaAs) can also be used. In certain variations, such a dielectric material has a refractive index of greater than or equal to about 1.0, and optionally greater than or equal to about 1.3. In certain variations, a suitable dielectric material has a refractive index of greater than or equal to about 1.3 to less than or equal to about 3. Thus, in certain variations, the dielectric material comprises a fused or amorphous silicon dioxide (SiO$_2$) material.

With reference to FIGS. 1(a)-1(e) and 6, an exemplary embodiment of a reflective plasmonic-nanoresonator angle robust color filtering device and its operational principles are shown. Such a color filtering device is a reflection-type filter. FIGS. 1(a) and 7 show an optical spectrum filtering device 30 that includes a metal layer 32 and a dielectric layer 34. As shown, metal layer 32 is formed of silver (Ag) and dielectric layer 34 is formed of silicon dioxide (SiO$_2$). A plurality of slits or nanogrooves 40 is defined within the metal layer 32. Further, the dielectric layer 34 is disposed (e.g., embedded) within each of the nanogrooves 40.

As discussed in greater detail below, while a plurality of nanogrooves is not required for effective color filtering via light tunneling in accordance with the present teachings, providing a plurality of such nanogrooves in proximity to one another does serve to increase an intensity or vibrancy of the filtered light. A grating structure can be used to create a plurality of nanogrooves parallel to one another. Thus, silver (Ag) can be conformally deposited on a dielectric layer that comprises a fused silica grating structure defined by a pitch ("P"), depth ("D"), and width ("W"). As shown in FIGS. 1(a) and 7, a periodic structure of adjacent nanogrooves is formed, where the period or pitch "P" between nanogrooves 40 determines periodicity of the grating structure. The grating pattern of nanogrooves 40 formed in metal layer 32 and filled or embedded with dielectric material 34 thus defines period "P" (a distance defined from a first side of a first nanogroove to a first side of a second nanogroove). A depth "D" and a width "W" of each nanogroove 40 are also shown. It should be noted that distance between nanogrooves may vary through the grating pattern or may be at regular intervals from one another.

In one exemplary embodiment, the period (P) between nanogrooves 40 may be less than or equal to about 300 nm, optionally less than or equal to about 250 nm, or preferably less than or equal to about 200 nm. Such dimensions are particularly suitable where the metal material layer 32 comprises silver and the dielectric material 34 comprises silicon dioxide. In certain variations, the period between nanogrooves may be greater than or equal to about 160 nm to less than or equal to about 200 nm. In certain variations, the width "W" of nanogrooves 40 is greater than or equal to about 40 nm to less than or equal to about 90 nm. In yet other variations, the depth "D" of nanogrooves 40 may be greater than or equal to about 110 nm to less than or equal to about 170 nm.

A corresponding scanning electron microscope (SEM) image of a fabricated device with width (W)=45 nm, depth (D)=160 nm, and period (P)=180 nm with θ as the incident angle of light is shown in FIG. 1(b). As noted above, while the inventive technology contemplates use of a single nanogroove within a metal layer, to enhance the intensity of filtered color and improve visibility, a plurality of nanogrooves may be formed near one another (either randomly or at regular intervals, as shown in the design of the optical filtering spectrum device 30 in FIGS. 1(a) and 6). Thus, the metal layer 32 may have a regular periodic structure. The metal layer 32 has a plurality of ridge or peak regions 44 where the nanogrooves 40 are present, but also defines a plurality of troughs or channels 46 in regions between the nanogrooves 40. Thus, an undulating surface pattern or profile of ridges/peaks 44 and troughs 46 is defined by the metal material layer 32. The plurality of nanogrooves 40 are thus formed in the peak regions 44 of the metal material layer 32.

With renewed reference to FIG. 1(a), a source 50 of electromagnetic radiation is directed towards the optical spectrum filtering device 30 along a first side 52 of dielectric layer 34. The filtering device 30 is capable of transmitting a portion of a spectrum of electromagnetic radiation from source 50 into each nanogroove 40. Thus, a portion of electromagnetic radiation enters through the dielectric layer 34 into each nanogroove 40. The path of the electromagnetic radiation 50 depends upon whether the optical spectrum filtering device 30 is designed to be a transmission-type filter, a reflection-type filter, or a transmission and reflection-type filter. As shown in the reflection-type optical spectrum filter 30 of FIG. 1(a), the portion of electromagnetic energy 50 that enters the dielectric material 34 and is funneled into nanogrooves 40. A portion of the electromagnetic energy 50 is reflected at first side 52, where the resonant wavelength(s) is/are trapped or absorbed by localized plasmonic resonance occurring within the nanogrooves 40, so that the remainder of non-absorbed wavelengths reflected. A filtered output 54 having a predetermined range of wavelengths then exits the optical spectrum filtering device 30.

As opposed to trapping the incident light from source 50 into surface plasmon modes through grating coupling (as in conventional filter structures), the dimensions and periodicity of structures having nanogrooves 40 like those in FIG. 1(a) have been designed to concentrate the light into the silica filled nanogrooves based on a phenomena recognized as light funneling.

In the simulations and experiments detailed herein, broadband collimated light illumination in the wavelength range λ=400-800 nm is supplied as the input. The simulation is performed using finite difference time domain (FDTD) method for the field distribution details and rigorous coupled wave analysis (RCWA) is used to calculate the angle resolved reflection and absorption spectra.

The optical measurement is conducted using two systems to obtain the reflection/absorption spectra at normal and angled incidence. Reflection spectra at normal incidence are measured using Nikon TE300 inverted microscope with a halogen lamp for the light source. Reflection spectra with angled incidence are measured from 45° to 75° (2° increment) swept perpendicular to the grating orientation, as depicted in FIG. 1(a), with a J. A. Woollam M-2000 ellipsometer. The numerical apertures of the collection optics in both systems are as low as 0.04 to ensure high angular resolution. Sweeping the incident angle along the grating direction does not exhibit iridescence.

As light is incident on the nanogroove 40 array, an induced polarization charge pair accumulates at the top corners 60 of the nanoslit/nanogrooves 40. This charge pair acts as a dipole and further alters the E-field of incident light, redirecting the light into the nanogroove 40. FIG. 1(c) shows this effect with a red-blue surface plot and arrow plot which represents the normalized polarization charge distribution induced by the scattered field and propagation direction of the field's Poynting vector, respectively. The arrows near the metal layer 32 (Ag) and dielectric layer 34 (silica) interface point toward the nanogroove 40 verifying this funneling effect. In FIG. 1(d), intensity distribution of the magnetic field $|H_y|^2$, under the funneling condition for a device where P=180, W=50, and D=170 nm, shows that the light is well confined in the nanogroove 40 at the resonant wavelength.

Such a desirable angle insensitive color filtering is believed to result from the fact that light is funneled into metal-insulator-metal Fabry-Perot (MIMFP) cavity modes. By varying the optical path length in the MIMFP cavity by modifying a width and depth of the nanoslits/nanogrooves 40, a resonance of the filtering device 30 structure can be tuned across the entire visible electromagnetic radiation spectrum. The MIMFP resonant wavelength, λ, is determined by the effective refractive index, $n_{eff}$, and the depth, D, in the Fabry-Perot resonance equation, $$\left(\frac{1}{4} + \frac{1}{2}m\right)\lambda = n_{eff}D,$$

where m is a positive integer and $n_{eff}$ is the effective refractive index of MIM waveguide modes. The effective index is insignificantly dependent on the nanogroove depth, D, but is highly dependent on acute changes in the width, W. The effective indices, $n_{eff}$, are calculated for changing values in width, W. For example, when the dielectric layer 34 (or insulator $SiO_2$) width W=50 nm, the effective index dispersion relation of even modes in a MIM waveguide is found to be $n_{eff}$=1.85, 1.90, and 2.02 for wavelengths of λ=620, 532, and 460 nm, respectively. When W=60 nm, $n_{eff}$=1.91, 1.99, and 2.11, respectively.

Such principles can thus be integrated into various designs and applications, as well as to accommodate different manufacturing processes, because there is a wide degree of freedom in modifying the filtered color by changing either D or W. Furthermore, by simply changing the nanogroove width, but maintaining the nanogroove depths, the fabrication process can be greatly simplified and can be easily scaled to large area devices. In accordance with various aspects of the present teachings, this coupling to the MIMFP by means of funneling, as opposed to grating coupling into waveguide or plasmonic modes, desirably achieves angle insensitive performance for filter devices.

In various aspects, the present teachings thus contemplate ultra-high resolution, widely tunable color filtering devices. As detailed herein, resonant wavelength, namely the wavelength of the absorption peaks (reflections dips), can in certain variations, be tuned throughout the entire visible spectrum by adjusting the nanogroove 40 depth D. For this simulation and experiment, the nanogroove width, W, is held constant at 50 nm and the nanogroove period, P, is held constant at 180 nm. In three different reflective filter devices formed, depths (D) of the nanogrooves 40 corresponding to yellow, cyan, and magenta reflective colors are found to be 110 nm, 130 nm, and 170 nm are thus formed in the filter devices, respectively.

FIG. 1(e) presents the simulated and measured reflection spectra (and measured absorption spectra in the inset) of the above three devices with varying depths D at normal incidence and TM polarized light. More specifically, simulated results are shown in solid lines and measured results in dashed lines, while measured absorption spectra (inset, dashed lines) at D=110 nm, 130 nm, and 170 nm in blue, green, and red curves, given fixed P=180 nm and W=50 nm at normal incidence are also shown. These devices are able to trap light as much as 96% at the resonance wavelength and reflect all other wavelengths. The optical propagation loss in silver at shorter wavelengths is non-negligible, resulting in an 80% absorption peak at the shorter wavelength. This strong absorption at the selected wavelength range can thus be used in accordance with the inventive technology to create high purity reflective color filtering.

In addition to the color tuning based on changing D, FIG. 1(f) shows that the three basic colors of the cyan, magenta, and yellow (CMY) color scheme are achieved by adjusting the width of the nanogroove W from 40 nm to 90 nm, given fixed P=180 nm and D=170 nm. It is noticed that the broad resonance dip on the yellow device is due to larger propagation loss of the MIM waveguides at higher frequencies. A better reflection dip for yellow can be achieved by changing D to 110 nm with W to 50 nm as shown in the blue solid and dotted lines in FIG. 1(e). Such a method of holding the period and depth constant while varying the widths of the nanogroove presents in certain aspects a more desirable method of manufacturing, where the depth of reactive ion etching (RIE) is held constant and the width of each colored pixel is altered, allowing multiple color pixels to be produced on a single wafer.

Thus, in various aspects, an optical spectrum filtering device comprises a metal material layer defining at least one nanogroove and a dielectric material disposed adjacent to the metal material layer and disposed within (e.g., filling) the at least one nanogroove. The filtering device is capable of transmitting or reflecting a portion of an electromagnetic spectrum via localized plasmonic resonance to generate a filtered output having a predetermined range of wavelengths that displays minimal angle dependence, or is angle insensitive.

In various aspects, the present disclosure provides a filter having reduced or minimal angle dependence, meaning that as the viewing angle deviates from normal (0°) to parallel to the visible surface (nearing 90°), the wavelength of the filtered light is not considerably shifted. Thus, an optical spectrum filtering device having minimal angle dependence is capable of generating a filtered output having a predetermined range of wavelengths that deviate less than or equal to 25 nm when the filter device is observed from incidence angles ranging from 0 to 90°.

Preferably, color filter devices that are angle insensitive do not exhibit a detectable shift in wavelength based on viewing angle. In certain aspects, an optical spectrum filtering device according to the present disclosure is angle insensitive, meaning that the wavelength of filtered light shifts less than 5%, preferably less than 3%, more preferably less than 2%, and in certain variations, less than 1% as the viewing angle varies from 0° to 90°. Angle-insensitive behavior is possible for the spectrum filtering devices due to the localized resonance that occurs via light funneling into the nanogrooves of the filter devices according to the present teachings. In certain embodiments, an optical spectrum filtering device having angle insensitivity is capable of generating a filtered output having a predetermined range of wavelengths that deviate less than or equal to 20 nm, optionally less than or equal to about 10 nm, and in certain variations less than or equal to about 5 nm, when the filter device is observed from incidence angles ranging from 0 to 90°. As noted above, angle dependency is a frequent problematic issue with conventional color filters used in display devices, even in conventional Fabry-Perot (F-P) based and SPP based grating filters. Therefore, in accordance with the principles of the inventive technology, by creating structures comprising nanogrooves that employ localized plasmonic resonance for filtering light, the angle dependency of such an optical spectrum filtering device can be significantly minimized or eliminated altogether. This principle applies to both transmission and reflection optical spectrum filter devices, like color filters.

In various aspects, the optical spectrum filtering device is a reflection-type filter, so that the filter is capable of transmitting a portion of the electromagnetic spectrum through the dielectric material layer. The portion of the electromagnetic spectrum can be transmitted through the dielectric material layer disposed adjacent to the metal material layer and disposed within (e.g., filling) the at least one nanogroove. The transmitted portion of the electromagnetic spectrum thus enters a first side of the nanogroove, but is reflected by the metal material defining the nanogroove, so that the filtered output of the electromagnetic spectrum exits the same side of the nanogroove (e.g., so that it is reflected). For example, a portion of the electromagnetic spectrum (e.g., 54 of FIG. 1(a)) enters on a first side (side 52) of the filter device 30 and the filtered output 54 is reflected via localized plasmonic resonance and funneling within the nanogroove 40 defined by metal layer 32, so that the filtered output 54 exits on the same side 52. Thus, the spectrum filtering, for example, of electromagnetic radiation in the visible spectrum, is achieved by coupling light into nanoscale photonic resonators formed by the one or more nanogrooves in the metal layer, via a light funneling process. A grating structure can optionally be present to help increase the transmission or reflection efficiency, but is not required for coupling the light via localized plasmonic resonance for functioning.

In certain variations, the optical spectrum filtering device is a reflection-type filter that generates a filtered output that exits the filter assembly having a predetermined range of wavelengths in the visible light range. Such a predetermined range of wavelengths may include a color selected from the group consisting of: cyan, magenta, yellow, and combinations thereof, which can produce colors such as red, green, blue.

To demonstrate the visual performance of certain color filters prepared in accordance with certain aspects of the inventive principles, colored images in the form of the Olympic Rings are fabricated, as shown in FIGS. 2(a)-2(f). FIG. 2(a) and its insets (FIGS. 2(e)-2(f)) show SEM images of such devices. The corresponding optical image of these reflective color filters is shown in FIG. 2(b). The period, P, and depth, D, of each ring are held constant while the widths, W, vary from 40 nm to 90 nm to generate the different colors. The full range of cyan magenta yellow (CMY) colors are thus achieved by varying nanogroove widths from 40 to 90 nm, including blue and red. The angular dependence of these images is measured only up to 30 degrees, because of the small size of the structure and the limitation of the optical path in the microscope. Within this range of angles, the color appears unchanged. Large scale devices fabricated through nanoimprint lithography are also contemplated, where the angled reflection spectrum and angle insensitivity have been demonstrated. With such design techniques, filtered colors of cyan, magenta, and yellow, as well as intermediate colors can be achieved. For example, the purple color from the rope held by the gymnast in the top middle ring of FIGS. 2(a) and 2(f) is produced by two nanogrooves. Moreover, the magenta color from the bow area in FIGS. 2(a) and 2(e) is produced by several isolated and segmented short lines, as small as 100 nm in length and 60 nm in width, demonstrating ultra-high color resolution.

Simulation results also show that even single and double slits or grooves having widths of tens of nanometers have color filtering effects. As such, the filtering devices generating such plasmonic structural color are capable of creating pixels with sizes beyond the diffraction limit of light. Accordingly, such filtering devices can be used to form super-pixels for imaging, in which colors are mixed between multiple super-pixels before their combined size is comparable to the diffraction limit.

In addition, an Olympic ring with two colors is fabricated to present an application of the polarization dependence of these filters. FIGS. 2(c) and 2(d) show an image with two sets of gratings, using polarization dependence to actively change the displayed image, where nanogroove widths of W=40 form cyan and W=60 nm form magenta under transverse magnetic (TM) polarized light illumination. As the polarization of incident light is changed, the displayed image is altered. Particularly, the central pattern is concealed when the incident light polarization changes from transverse magnetic (TM) polarized light (FIG. 2(c)) to transverse electric (TE) polarized light (FIG. 2(d)).

Such polarization dependence can be utilized in applications of cryptography and anti-counterfeiting. For example, such an image can be formed on a personal identification card. Counterfeiters may be able to reproduce the color of the symbol, but it would be increasingly difficult for a counterfeiter to make the image additionally dependent on polarization of light, adding another element to the validity and authentication of the identification card. This polarization dependence is also advantageous for implementation in visual display technologies by creating a multifunctional component that can serve as a conductive electrode, polarizer, and color filter simultaneously.

Angle insensitivity filter design is discussed further herein. More specifically, the effect of periodicity on the angle robustness of metallic nanogrooves/nanoslits is investigated here. Where the width of the nanogroove is 50 nm (W=50 nm) and diameter of the nanogroove is 180 nm (D=180 nm), the simulated angle resolved reflection spectra contour plots at periods of P=140 nm (FIG. 3(a)), 180 nm (FIG. 3(b)), 220 nm (FIG. 3(c)), and 260 nm (FIG. 3(d)) are shown. Incremental changes of 40 nm in the period are chosen to illustrate three different regimes: grating coupling, localized resonance, as well as cavity coupling between neighboring waveguides, which is explained further below. FIGS. 3(a) and 3(d) indicate higher angle dependence than FIGS. 3(b) and 3(c).

When the period P=140 nm, 220 nm, and 260 nm, the MIMFP resonance position shifts with increasing incident angle of light (FIGS. 3(a) and 3(c)-3(d)), whereas the spectrum at the periods of 180 nm (FIG. 3(b)) remains at relatively constant wavelengths over all incident angles. Furthermore, the angular behavior of absorption at the resonance wavelength 630 nm with P=140, 180, 220 and 260 nm are presented in FIG. 3(e) showing that the absorption reaches over 90% for ±90° angle range with P=180 nm. This shows that angle independence is achieved at a periodicity of 180 nm for visible wavelengths of light. Above or below P=180 nm, the resonance wavelength corresponding to the absorption peak is angle dependent and therefore less efficient.

FIG. 4 shows experimental angle insensitive spectrum filtering. The angle resolved reflection spectra from angles of 45° to 75° are measured on various large scale fabricated devices based on nanoimprint lithography. In FIG. 4(a), the angle resolved reflection spectra of a design with sweeping incident illumination angle from 45° to 75° are presented with the following device dimensions: FIG. 4(a) P=180, W=50, and D=130 nm, FIG. 4(b) P=180, W=50, and D=170 nm, FIG. 4(c) P=220 nm, W=50 nm, and D=160 nm. Thus, two filter designs prepared in accordance with certain aspects of the present disclosure are shown in FIGS. 4(a) and 4(b) having a period of 180 nm and depths D, of either 130 nm (FIG. 4(a)) and 170 nm (FIG. 4(b)), respectively. A comparative device fabricated with a period of 220 nm exhibited angle dependence. The angle resolved reflection spectra of this comparative device, with P=220 nm, W=45 nm, and D=160 nm, is displayed in FIG. 4(c). 25 nm Δλ is observed per 30° change in incident illumination angle. This change in reflection dip is not observed at P=180 nm (FIGS. 4(a) and 4(b) show flat band absorption response indicating angle insensitivity) thus exhibiting strong agreement between measured and simulated spectra. FIG. 4(c) on the other hand, shows 25 nm resonance wavelength shift per 30° change in incident illumination angle representing coupling between MIMFP and GASP modes. Through this analysis, it can be concluded that a color filter structure with a range of periods from 160 nm to 200 nm desirably possesses angle robust spectrum response.

The mechanism for angle dependence when the period is outside the optimal range discussed above (e.g., where the period, P>200 nm and P<160 nm) is explored herein. As shown in FIG. 3(e), the side lobes of the absorption maxima develop at large angles of incidence. Therefore, the resonant modes at these larger degrees of incidence are investigated. For a period of greater than 180 nm (P>180 nm), two modes appear to be involved in this phenomenon. Metal-insulator-metal Fabry-Perot (MIMFP) cavity mode resonances are angle independent modes, illustrated as straight dashed lines, and grating assisted surface plasmon modes (GASP) generated under the Bragg coupling condition are highly angle dependent, illustrated by the curved dashed lines in FIGS. 3(a), 3(b), 3(c) and 3(d). The increasing angle leads to the interaction between the MIMFP modes and the grating assisted surface plasmon modes (GASP) due to momentum matching.

For TM-polarized waves, the momentum matching equation for grating assisted surface plasmon resonance excitation of dielectric-metal interfaces is governed by the following relationship.

$$\frac{m}{\Lambda} + \frac{1}{\lambda}\sin\theta = \frac{1}{\lambda}\sqrt{\frac{\epsilon_1}{\epsilon_1 + \epsilon_2}}.$$

In this equation, m represents the diffraction order, Λ the period (denoted in the figures as P), λ the wavelength, θ the incident angle, and $\epsilon_1$ and $\epsilon_2$ are the permittivity of the metal and dielectric materials respectively. The dashed curves in FIGS. 3(a), 3(b), 3(c), and 3(d) extend from the ultraviolet to the visible region with increasing periodicity, and finally result in a strong coupling between the GASP and the MIMFP cavity modes. The field distribution of this coupling is addressed later. However, Λ is found to be proportional to λ in the above equation, which accordingly provides a guideline for selecting an appropriate period for a structure for a filter that has angle independent plasmonic resonance at desired wavelength bands.

When the period of the structure is less than 180 nm (P<180 nm), the MIMFP resonance band blue shifts at incident angles greater than 60°. This is believed to be due to the breakdown of the assumption that nanoslit or nanogroove structures are well separated (nanogroove width W<<Period P). When the thickness of the slit or groove spacing (P−W=groove spacing) is too small, the dispersion has to be reconsidered due to coupling between neighboring metal-insulator-metal (MIM) waveguides.

FIGS. 5(a)-5(f) show optical mode coupling and period dependent field confinement. FIG. 5(a) shows mode dispersion with respect to the groove spacing (P−W) and period, as well as the definition of even and odd modes in the insets with the graph. In this scheme, even and odd modes are defined in FIG. 5(a), which indicate whether the field is in-phase or out-of-phase in the neighboring grooves, respectively. The field distributions of $H_y$ of both even and odd modes at an incident angle of 75° are plotted in FIGS. 5(b) and 5(c), respectively. Moreover, the dispersion in FIG. 5(a) clearly indicates that the splitting between even and odd modes increases as the groove spacing (P−W) reduces. This trend follows the observation found in FIGS. 3(a) and 3(b) denoted by the straight dashed lines and dotted lines for the even and odd modes. Only when the incident angle of light is large enough can the odd mode be excited due to phase requirement, which causes the resonance shift to shorter wavelengths at incident angles greater than 60°.

The resonance mode for a period of 180 nm indicates that the field is mostly concentrated within the nanogroove. Alternatively, when the period is greater than 220 nm the field is both in the nanogroove and on top of the grating. This indicates strong coupling between MIMFP and GASP modes, leading to the angular dependence of the reflection dips. FIG. 5(d) confirms that the field is well confined within the nanogroove corresponding to a MIMFP mode, while FIGS. 5(d) and 5(f) show strong surface modes illustrating coupling to the GASP modes. The information in these figures also confirms that the angle independent reflection spectra occur at periods <180 nm for visible wavelengths of light. In various aspects, one or more nanogrooves in the localized plasmonic nanoresonator assembly according to the present disclosure are thus sized to suppress formation of surface plasmon modes, for example to avoid coupling of GASP and MIMFP modes.

Moreover, the light confinement is manipulated with respect to periodicity P in the FIGS. 5(d), 5(e), and 5(f) with stronger coupling into GASP modes for larger periods. The period controllable optical field confinement in this nanostructure filter is thus a design principle for applications that require strong field confinement, such as optical trapping, high sensitivity nanofluidic index sensors, and plasmonic enhanced nanoscale emitters, by way of example.

In certain alternative aspects, the optical spectrum filtering device is a transmission-type filter. In such a case, the filter device is capable of transmitting a portion of the electromagnetic spectrum through both a metal material layer defining at least one nanogroove and a dielectric material disposed adjacent to the metal material layer and disposed within (e.g., filling) the at least one nanogroove. The transmitted portion of the electromagnetic spectrum thus enters a first side of the nanogroove, but exits on the opposite side of the nanogroove, so that it is transmitted. In certain variations, the optical spectrum filtering device transmission-type filter generates a filtered output that exits the filter assembly having a predetermined range of wavelengths in the visible light range. Such a predetermined range of wavelengths may include a color selected from the group consisting of: red, green, blue, and combinations thereof.

In certain other variations, the optical spectrum filtering device may use both a transmission-type filter and the complementary reflection spectrum, so that both a transmitted portion of light and a reflected portion of light are used, e.g., for a display.

Accordingly, in certain aspects, the present disclosure provides a transmission-type angle insensitive optical spectrum filtering device comprising a localized plasmonic nanoresonator assembly. The assembly comprises a metal material layer defining at least one nanogroove. The localized plasmonic nanoresonator assembly also comprises a dielectric material disposed adjacent to the metal material layer and disposed within the at least one nanogroove. The localized plasmonic nanoresonator assembly is configured to funnel and absorb a portion of an electromagnetic spectrum in the at least one nanogroove via localized plasmonic resonance to transmit a filtered output. The filtered output has a predetermined range of wavelengths that displays angle insensitivity so that the predetermined range of wavelengths varies less than or equal to about 20 nm from an incidence angle of 0 to an incidence angle of 90° with respect to the filtering device. In certain variations, at least one nanogroove is an open channel formed in the metal material layer. The dielectric material is disposed in the open channel. In other variations, the metal material layer is multi-layered and comprises a metal layer sandwiched between two highly reflective metal layers. One or more nanogrooves are formed in the metal layer and the dielectric material forms a layer adjacent to the metal material layer. The dielectric material is further disposed within the one or more nanogrooves. In yet other variations, the metal material layer defines an undulated surface profile having a plurality of ridges/peaks and troughs, where a plurality of nanogrooves is formed in the peaks of the metal material layer.

An exemplary embodiment of an exemplary angle insensitive transmission-type optical spectrum filtering device is shown in FIGS. 7(a)-7(d). An optical spectrum filtering device 100 includes a metal layer 102 and a dielectric layer 104. As shown, metal layer 102 is formed of silver (Ag) and dielectric layer 104 is formed of silicon dioxide (SiO$_2$). A plurality of slits or nanogrooves 110 is defined within the metal layer 102. Each nanogroove 110 is an open channel formed in the metal material layer 102. A dielectric material 104 is disposed adjacent to the metal material layer 102 and disposed (e.g., embedded) within each of the open channel nanogrooves 110. The design in FIG. 7(a) is similar to the exemplary reflection-type color filter described above in the context of FIGS. 1(a) and 6, except that the nanogrooves 110 define a plurality of openings that extend fully through the metal layer 102 to define open channels. The dielectric material (SiO$_2$) 104 thus has a periodic structure without the top or end being blocked by the metal layer 102.

The localized plasmonic nanoresonator assembly is defined by dimensions of a plurality of nanogrooves 110. Specifically, the nanostructure is defined by each nanogroove 110 width (W), height (D) and a period P between respective nanogrooves 110. Incident electromagnetic energy 130 is directed to a first side 132 of the optical spectrum filtering device 100. A reflected portion 134 of the electromagnetic energy reflects from the first side 132; however a resonant wavelength output 136 having a predetermined range of wavelengths is transmitted through and filtered by the localized plasmonic nanoresonator assembly. The filtered resonant wavelength output 136 thus exits a second side 138 of the optical spectrum filtering device 100.

As shown in FIG. 7(b), based on a calculation with real silver (Ag) refractive index model, the transmission spectra for blue, green, and red can be achieved by varying nanogroove 110 depth (D) from greater than or equal to about 70 nm to less than or equal to about 120 nm. Moreover, the angle resolved spectrum simulation in FIG. 7(c) shows that the resonance holds at 470 nm from launching angles of 0° to 80°. Therefore, this localized plasmonic nanoresonator assembly transmissive filtering device design not only provides a widely tunable resonance through the visible region, but also holds the resonance wavelength with viewing angle up to at least 80°.

Field intensity distribution (|Hy|$^2$) at a resonance wavelength is plotted in FIG. 7(d) for the transmission-type optical spectrum filtering device 100. This mode distribution is found to share the same principle with the reflection type color filter, namely a MIMFP mode. This MIMFP resonance condition can be described as ½ mλ=n$_{eff}$D. The missing ¼λ is due to boundary conditions of the MIMFP assembly structure in FIG. 7(a), where both ends of the nanogroove 110 are open ended having a dielectric material 104 disposed therein.

Color tunability and color purity are two important factors of the transmission color filters. Color tuning mechanisms are explored herein with regard to color tunability and color purity issues for the MIMFP modes in transmission-type nanoresonator plasmonic structures based on the MIMFP resonance condition. This resonance condition indicates that the resonance can be manipulated with varying n$_{eff}$, which can be achieved by changing W, the width of the nanogrooves 110. A simulation in FIG. 8(a) demonstrates a transmission resonance from blue to red across the entire visible regime by changing a width (W) of nanogrooves from 60 nm to 20 nm, given a fixed period between nanogrooves of 180 nm. Compared to the color tuning method by changing depth (D) of nanogrooves, this method in certain aspects provides simpler and low-cost fabrication. In addition, an average transmission percentage is above 70%.

It is also found that the background at longer wavelengths for each spectrum increases with nanogroove width (W). This phenomenon can potentially cause color impurity issues for a color filter application. A simulation is performed and demonstrated in FIG. 8(b) to explore a relationship between large flat background and nanogroove width (W). Given the fixed period P between respective nanogrooves and a resonance wavelength λ, this simulation shows the transmission spectra in various widths swept from 60 nm to 20 nm. As the nanogroove width (W) decreases, the flat background at longer wavelengths is further suppressed. When nanogroove width W=20 nm, the background is completely suppressed.

To further understand this background change with W, a MIMFP cavity 150 shown in FIG. 8(c) is applied to be equivalent to a typical dielectric Fabry-Perot (FP) model 160 in FIG. 8(c). Transmission T$_{FP}$ for a Fabry-Perot is determined by a reflection coefficient for normal incidence $$R = \left(\frac{n_{in}-n_{out}}{n_{in}+n_{out}}\right)^2$$

in the following equation $$T_{FP} = \frac{(1-R)^2}{(1-R)^2 + 4R\left(\sin\left(\frac{n_{in}D}{\lambda}\right)\right)^2}.$$

According to this equation, off-resonance $T_{FP}$ magnitude (which indicates background) is determined by the denominator. In other words, the off-resonance $T_{FP}$ will be suppressed when R approaches 1, which indicates $n_{in}$ has to be much larger than $n_{out}$. However, the $n_{in}$ in the case of MIMFP mode is not always large at longer wavelengths due to waveguide (WG) dispersion. The propagation constant dispersion of the MIM WG $$\left(\frac{2\pi n_{in}}{\lambda}\right)$$

is calculated in FIG. 8(d), where the green dashed line represents the optical wave propagation constant $$\left(\frac{2\pi n SiO_2}{\lambda}\right)$$

in silica ($n_{SiO2}$=1.46). This figure shows that the dispersion curve of the MIM WG has a propagation constant value 18.53 very close to that in silica material 15.46 at wavelength λ=700 nm when nanogroove width (W) is 60 nm. On the other hand, this value becomes 26.87 at λ=700 nm, when nanogroove width (W) is 20 nm. This conclusion indicates that narrower groove width W helps suppress the background transmission at longer wavelengths, and it agrees well with the simulation results in FIGS. 8(a) and 8(b). Thus, better background suppression performance occurs at smaller nanogroove widths W.

However, a trade-off between background suppression and color tunability is revealed in FIG. 8(d). According to the dispersion calculation shown in FIG. 8(d), nanogroove width W cannot be too small because color tunability is affected by small slit/groove width W. In the inset of FIG. 8(d), the propagation constant dispersion has visible wavelength region where MIM WG has dramatically increasing waveguide propagation loss (imaginary part of propagation constant) at shorter wavelengths, and the cavity resonance cannot form due to large loss in these regions. Those regions in the case of nanogroove widths W=60 nm, W=40 nm and W=20 nm are 400-420 nm, 400-440 nm, and 400-510 nm, respectively. These regions will thus increase when nanogroove width W decreases. Such a conclusion also agrees with the simulation results. In summary, it is believed that the relationship between nanogroove width (W) and lossy waveguide region indicates that the color tunability will be restricted if a nanogroove width W is chosen to be too small. Therefore, a trade-off between background suppression and color tunability can potentially affect performance of a transmission plasmonic color filter having such a design (as shown in FIG. 7(a), for example). Additionally, a small nanogroove width W can affect transmission magnitude, which is an important parameter for transmission color filters. In FIG. 8(b), the transmission maximum is shown to drop to 40% at W=20 nm.

For certain color filter applications, such as LCD color filters, color purity, color tunability, and transmission magnitude are all important parameters. In this trade-off, color purity requires a small nanogroove width W, whereas a large nanogroove width W enables better color tunability and large transmission magnitude. By combining this information regarding background suppression, color tunability, and transmission magnitude, the plasmonic nanoresonator assembly design of the filtering device like that in FIG. 7(a) verifies that these transmission type color filters are angle robust, but that a trade-off exists between color purity (due to the flat background at longer wavelengths), color tunability, and transmission magnitude.

Another embodiment of an angle insensitive transmission type optical spectrum filtering device according to certain aspects of the present disclosure is shown in FIGS. 9(a)-9(b). This transmission type filter comprises a localized plasmonic nanoresonator assembly that obviates some of the trade-offs discussed above in the context of the embodiment shown in FIG. 7(a) and thus is particularly suitable to certain applications, such as a color filter in an LCD device, where angle insensitivity, color purity, color tunability, and transmission magnitude are all important. In such a variation, the metal material layer is multi-layered and comprises a metal layer sandwiched between two highly reflective metal layers. At least one nanogroove is formed in the metal layer (and thus enclosed on both sides by the highly reflective metal layers at each end) and the dielectric material forms a layer adjacent to the metal material layer. The dielectric material is also disposed within the at least one enclosed nanogroove within the metal layer.

For example, FIG. 9(a) shows an optical spectrum filtering device 200 includes a multi-layered metal material 202 and a dielectric material 204. Multi-layered metal material 202 comprises a first highly reflective metal layer 206 adjacent to dielectric material 204 and a second highly reflective metal layer 208. The first highly reflective metal layer 206 and second highly reflective metal layer 208 sandwich a third metal layer 207 in which a plurality of nanogrooves 210 are formed. The dielectric material 204 is disposed adjacent to the multi-layered metal material 202 and disposed within the at least one nanogroove 210. In this filter design, the dielectric material 204 is discontinuous forming a lower layer 212 that is separated from a plurality of dielectric material regions 214 filling nanogrooves 210 by the first highly reflective layer 206.

As shown, a first highly reflective metal layer 206 and second highly reflective metal layer 208 are both formed of silver (Ag) mirrors, while metal layer 207 is formed of silver (Ag). Dielectric material 204 comprises silicon dioxide (SiO$_2$). Instead of having open ends at the either side of nanogrooves 210 (e.g., the MIMFP cavities formed in metal layer 207), this localized plasmonic nanoresonator assembly further includes the first and second highly reflective metal layers 206, 208 to provide high reflectivity at each respective end of the nanogrooves 210. Because this design does not rely on a large index contrast ($n_{in}$-$n_{out}$) to reduce flat background, it helps to decouple a trade-off between flat background suppression, color tunability, and transmission magnitude.

Incident electromagnetic energy 250 is directed to a first side 212 of the optical spectrum filtering device 200. A reflected portion 252 of the electromagnetic energy reflects from the first side 212; however a resonant wavelength output 254 having a predetermined range of wavelengths is transmitted through and filtered by the localized plasmonic nanoresonator assembly. The filtered resonant wavelength output 254 thus exits a second side 220 of the reflective angle insensitive optical spectrum filtering device 200.

Based on the filter design in FIG. 9(a), nanogroove parameters of period P, depth D, and slit width W can be optimized to provide a set of red, green and blue (RGB) color filters. These color filters have good color purity and color tunability with a fixed nanogroove depth D=90 nm and a thickness (DM) of both the first highly reflective metal layer 206 and second highly reflective metal layer 208 being about 20 nm, as shown in FIG. 9(a).

Furthermore, the present disclosure also provides in various aspects, methods of making angle insensitive optical spectrum filtering devices comprising a localized plasmonic nanoresonator assembly. Such methods include forming a localized plasmonic nanoresonator assembly comprising a metal material layer defining at least one nanogroove and a dielectric material disposed adjacent to the metal material layer. The dielectric material is also disposed within the at least one nanogroove defined by the metal material layer. A grating structure can be first formed in the dielectric material, for example, by an etching or ablation step. This can be followed by a step where the metal material is deposited over the dielectric grating structure. Techniques such as nanoimprint lithography, focused ion beam processing, e-beam lithography, stamping or metal transfer printing can be used, as are well known in the art. In this manner, the metal material having one or more nanogrooves defined therein and having a dielectric material disposed therein can be formed that are capable of absorbing a portion of an electromagnetic spectrum via localized plasmonic resonance to generate a filtered output having a predetermined range of wavelengths.

The filtering devices described in various embodiments of the present disclosure can thus be fabricated by nanoscale lithography, reactive ion etching (RIE), and metal deposition. Nanoimprint lithography (NIL) is used to fabricate samples with large enough areas for angle resolved reflection measurements to confirm angle insensitive color response. Electron beam (e-beam) lithography is used to create patterned images in the form of the Olympic Rings (FIGS. 2(a)-2(f)) and demonstrate colors with resolution beyond the diffraction limit. The respective lithography techniques are used to create a resist template on a fused silica substrate. For NIL, an angled evaporation is used to tune the width of patterned resist. Nickel (Ni) is then e-beam evaporated over the patterned substrate and a lift off process is performed. The Ni is then used as an etch mask for a RIE process defining the depth, D, of the silica grating. After the silica etch, the Ni mask is removed in nitric acid and Ag is then sputter deposited conformally covering the silica grating and finalizing the fabrication process.

In FIG. 10, one such exemplary, non-limiting fabrication process is provided in accordance with certain aspects of the present disclosure for making an exemplary transmission-type optical filtering device. In a first step 300, nanopatterning lithography, such as e-beam lithography (EBL) is used to deposit a pattern 302 onto a fused silica substrate 304. In a second step 310, nickel 312 is deposited on fused silica 304. The nickel mask pattern lift-off is then performed to remove the nanopatterned material 302 and deposit nickel 312. Afterwards in step 320, an etching step is conducted to remove a portion of fused $SiO_2$ material not protected by nickel 312, thus creating a protrusion 322. The plurality of protrusions 322 formed on the fused silica 304 form a periodic structure, such as a grating. Next in 330, a self-aligned plating seed layer 332 is patterned. In step 340, the nickel mask 312 and a portion of the seed layer 332 is removed from protrusion 322. Finally, in 350, silver (Ag) plating 352 is applied over the seed layer 332. Other materials or methods of depositing such materials known to those of skill in the microfabrication arts may likewise be employed in such methods to form an optical spectrum filtering device.

Yet another variation of an angle insensitive transmission type optical spectrum filtering devices according to the present disclosure is shown in FIGS. 11(a)-11(b). A coupled cavity transmission-type optical spectrum filtering device 400 includes a localized plasmonic nanoresonator assembly having a metal layer 402 and a dielectric layer 404. As shown, metal layer 402 is formed of silver (Ag) and dielectric layer 404 is formed of silicon dioxide ($SiO_2$). A plurality of slits or nanogrooves 410 is defined within the metal layer 402. Further, the dielectric material layer 404 is disposed (e.g., embedded) within each of the nanogrooves 410. In certain variations, the localized plasmonic nanoresonator assembly comprises two adjacent nanogrooves 410 oriented in an opposite direction from one another to form a coupled cavity that can transmit a filtered output having a predetermined range of wavelengths (e.g., a resonance wavelength).

The design in FIG. 9(a) is similar to the reflection-type color filter described above in the context of FIGS. 1(a) and 6, where the metal material layer defines an undulated surface profile having a plurality of peaks and troughs. A plurality of nanogrooves is formed in the peaks of the metal material layer. In FIG. 9(a) the geometry and thickness of the metal layer 402 surrounding nanogrooves 410 are designed to optimize transmission (rather than reflection) of a resonant wavelength 454. The nanostructure of each nanogroove 410 includes width (W), height (D) and a period P between respective nanogrooves 110. Metal layer 402 has a thickness in a sidewall region (WS) covering each side of the nanogroove 410, a top metal thickness (DT) above each nanogroove 410, and a bottom metal thickness (DB) in channel or trough regions 416 between nanogrooves 410. Thus, at least two of the nanogrooves 410 form a coupled cavity. Such a coupled cavity angle insensitive optical spectrum filtering device reduces complexity of the fabrication process and provides another approach to transmission color filters employing localized plasmonic resonance.

Incident electromagnetic energy 450 is directed to a first side 430 of the optical spectrum filtering device 400. A reflected portion 452 of the electromagnetic energy reflects from the first side 430; however a resonant wavelength output 454 having a predetermined range of wavelengths is transmitted through and filtered by the localized plasmonic nanoresonator assembly. The filtered resonant wavelength output 454 thus exits a second side 432 of the optical spectrum filtering device 400. As noted above, two adjacent nanogrooves 410 together form a coupled cavity that can transmit the filtered resonant wavelength output 454 having a predetermined range of wavelengths.

Simulated transmission spectra of the coupled cavity transmission-type optical spectrum filtering device 400 are shown in FIG. 11(b). By changing or sweeping width (W) from 50 nm to 90 nm, the transmission maxima changes from 530 nm to 730 nm, where top metal thickness DT=70 nm, bottom metal thickness DB=50 nm, sidewall thickness WS=15 nm and nanogroove depth and period are fixed at depth D=100 nm and period P=140 nm.

FIGS. 12(a)-12(d) show the mechanism of this coupled cavity transmission-type optical spectrum filtering device 400 design. FIG. 12(a) is a general schematic of a coupled cavity transmission-type angle insensitive optical spectrum filtering device. The coupled cavity design can be divided into two cavities—back and front cavities shown in FIGS. 12(b) and 12(c). When sidewall thickness of metal layer (WS) is thicker, the two cavities formed by respective nanogrooves 410 are isolated. On the other hand, the two cavities formed by respective nanogrooves 410 start to couple when the two cavity modes spatially and spectrally overlap. The spatial overlap can be explained in the field plots of the front and back cavities shown in FIG. 12(d). The field plots of the back (FIG. 12(b)) and front cavities (FIG. 12(c)) are based on the field distribution at the resonance wavelength with the assumption of thick sidewalls (WS=50 nm), but either of the two modes can still extend into boundary of each other. When the metal layer side wall thickness (WS)=15 nm, the field distribution at transmission resonance shown in FIG. 12(d) is simply the addition of the two field plots in FIGS. 12(b)-12(c). This indicates spatially overlapped fields of the two cavities in the nanogrooves 410.

As for the spectral overlap, the absorption spectra of the front and back cavities show mode spectra in FIG. 13. The front mode has sharp resonance at 490 nm, whereas the back mode has broad resonance with central wavelength 600 nm. With cavity coupling effect, the resonance with cavity coupling is located right at middle of the two values –550 nm. The angular response spectrum filtering is tested in simulation and experiment, respectively. Both spectra indicate that the resonance wavelength shift is smaller than 7 nm when viewing angle sweeps from 0 to 70 degrees. This robust angular response on the resonance wavelength is again believed to be due to the MIMFP mode generated by the coupled cavity transmission-type optical spectrum filtering device having a localized plasmonic nanoresonator assembly. Such a filtering device shows very good angle tolerance, color purity, and color tunability.

In this variation, a thinner metal layer (bottom metal thickness (DB)) between nanogrooves is tested. When the bottom metal thickness DB reduces from 50 nm to 30 nm, the spectrum in FIG. 14(a) clearly indicates a Fano shape resonance with a peak wavelength at 576 nm. However, here angle tolerance becomes less robust. In FIG. 14(b), the resonance located at 576 nm shows angle tolerance of 45 degrees, which is less robust or more angle tolerant than when bottom metal thickness DB is at 50 nm. The transmission spectrum drops to zero across the entire visible range when an angle is larger than 45 degrees. The main reason for the less robust angle tolerance is due to the Fano resonance, which is contributed to by the two transmission pathways shown in FIG. 14(c). One of the pathways is the cavity coupling, which is defined as a dark mode in Fano resonance model and is described in FIGS. 12(a)-(d). Another pathway is the light that penetrates directly through the bottom metal, which is considered as a bright mode. The second pathway cannot be ignored when DB=30 nm, because transmission through this pathway accounts for 10-30% of the total transmission. It has been studied in photonic crystals structure that transmission and reflection type Fano resonances are sensitive to the incident angle of light due to the angle dependent far field interference. Therefore, it is generally desirable to suppress this pathway to have better angle robustness of the transmission resonance. The interaction of these two pathways can be seen in FDTD simulation, and moreover, the shape of the resonance agrees with the universal analytic equation for Fano resonance. According to angle swept absorption spectrum in FIG. 14(d), the absorption maximum at the same wavelength dramatically increases from 30% to 90% around the angle of 45 degrees. It indicates that the light tends to be trapped in the front and back cavities due to the interference between the energy coupled from cavity coupling and the energy directly passes through bottom metal.

Optical spectrum filtering devices having minimal angle dependence or angle insensitivity prepared in accordance with the present disclosure are particularly suitable for a variety of display-based applications. The device designs are based on thin film structures, which can not only reduce angle dependence, but also simplify color filter manufacturing while also providing overall higher transmission efficiencies. Furthermore, because colored pixels may have smaller dimensions than the diffraction limit, multiple colored filters can be combined to form pixels having different colors. For example, such filtering devices may be used with any flat panel display, either transmission or reflection type, especially for high input power application, e.g., in 3D projection displays. For example, the filter devices may be used in liquid crystal displays (LCD); colored electronic books, tablets, monitors, or screens; or used as colorants in long-lasting colored prints (eliminating the need for pigments and other chemicals); flexible displays; projection displays and eye-wear displays; and imaging systems. In addition, the optical spectrum filtering devices of the present technology may be particularly useful for anti-counterfeiting and cryptography.

Accordingly, the present disclosure provides one dimensional nanostructure filtering devices with angle-robust color response. Light funneling is employed as a technique for angle independent coupling into localized resonance in metallic nanogrooves. Angle tolerant spectrum response, color tunability across the visible spectrum, and pixel size beyond the diffraction limit are also demonstrated by certain variations of the present technology. Thus, such filtering device structures can be used for super-high resolution optical storage. In certain aspects, angle dependence is avoided with a designed periodic structure for visible wavelength resonances employing MIMFP modes. Field confinement and manipulation within these nanogrooves or nanoslits induced through sub-wavelength periodic effects is used to design optical filtering devices. Such filtering devices are capable of wide color tunability in the visible wavelength regime and can be used to design devices that require consistent performance independent of incident angles of light.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transmission-type angle insensitive optical spectrum filtering device comprising:
   a localized plasmonic nanoresonator assembly comprising a multi-layered metal material layer comprising a metal layer sandwiched between two highly reflective metal layers, wherein the metal layer defines at least one nanogroove and a dielectric material disposed within the at least one nanogroove and disposed adjacent to one of the two highly reflective metal layers, wherein the localized plasmonic nanoresonator assembly is configured to funnel and absorb a portion of an electromagnetic spectrum in the at least one nanogroove via localized plasmonic resonance to transmit a filtered output having a predetermined range of wavelengths that displays angle insensitivity so that the predetermined range of wavelengths varies less than or equal to about 20 nm from an incidence angle of 0° to an incidence angle of 90° with respect to the filtering device.

2. The transmission-type angle insensitive optical spectrum filtering device of claim 1, wherein the metal material layer comprises a metal selected from the group consisting of: silver, aluminum, and combinations thereof.

3. The transmission-type angle insensitive optical spectrum filtering device of claim 1, wherein the dielectric material has a refractive index of greater than or equal to about 1.0.

4. The transmission-type angle insensitive optical spectrum filtering device of claim 1, wherein the dielectric material comprises silicon dioxide ($SiO_2$) and the metal material layer comprises silver.

5. The transmission-type angle insensitive optical spectrum filtering device of claim 4, wherein the predetermined range of wavelengths of the filtered output that exits the filtering device is in a visible light range and the metal material layer defines a plurality of distinct nanogrooves disposed parallel to one another that defines a periodicity of greater than or equal to about 160 nm to less than or equal to about 200 nm, wherein the at least one nanogroove has a width of greater than or equal to about 40 nm to less than or equal to about 90 nm and a depth of greater than or equal to about 110 nm to less than or equal to about 170 nm.

6. The transmission-type angle insensitive optical spectrum filtering device of claim 1, wherein the predetermined range of wavelengths of the filtered output that exits the filtering device is in a visible light range and has a color selected from the group consisting of: red, green, blue, and combinations thereof.

7. The transmission-type angle insensitive optical spectrum filtering device of claim 1, wherein the localized plasmonic nanoresonator assembly comprises two adjacent nanogrooves oriented in an opposite direction from one another to form a coupled cavity that can transmit the filtered output having the predetermined range of wavelengths.

8. A pixel for a display device comprising:
a color filtering device comprising a localized plasmonic nanoresonator assembly that comprises a multi-layered metal material layer comprising a metal layer sandwiched between two highly reflective metal layers, wherein the metal layer defines at least one nanogroove and a dielectric material disposed adjacent to one of the two highly reflective metal layers and disposed within the at least one nanogroove, wherein the localized plasmonic nanoresonator assembly is configured to funnel and absorb a portion of a visible light spectrum in the at least one nanogroove via localized plasmonic resonance to generate a filtered output having a predetermined range of wavelengths in a visible light range that displays angle insensitivity, so that the predetermined range of wavelengths varies by less than or equal to 20 nm at incidence angles ranging from 0° to 90° with respect to the color filtering device.

9. The pixel for the display device of claim 8, wherein the color filtering device has a plurality of distinct nanogrooves, so that the predetermined range of wavelengths of the filtered output that exits the color filtering device generates a color selected from the group consisting of: red, green, blue, and combinations thereof.

10. The pixel for the display device of claim 8, wherein the pixel is a multicolored pixel and the color filtering device has a plurality of nanogrooves comprising a first nanogroove and a second distinct nanogroove having at least one distinct dimension, wherein the first nanogroove is sized to funnel and absorb a first wavelength of the visible light spectrum via localized plasmonic resonance to generate a first filtered output and the second distinct nanogroove is sized to funnel and absorb a second wavelength of the visible light spectrum via localized plasmonic resonance to generate a second filtered output, wherein the first wavelength and the second wavelength are distinct from one another.

* * * * *

UNITED STATES PATENT AND TRADEMARK OFFICE
CERTIFICATE OF CORRECTION

| | | |
|---|---|---|
| PATENT NO. | : 9,547,107 B2 | Page 1 of 1 |
| APPLICATION NO. | : 14/210742 | |
| DATED | : January 17, 2017 | |
| INVENTOR(S) | : Lingjie Jay Guo et al. | |

It is certified that error appears in the above-identified patent and that said Letters Patent is hereby corrected as shown below:

On the Title Page

At Column 1, (71) Applicant, Line number 3, after "(US)", insert -- SANDIA CORPORATION, Albuquerque, NM (US) --.

At Column 1, (73) Assignee, Line number 9, after "(US)", insert -- SANDIA CORPORATION, Albuquerque, NM (US) --.

Signed and Sealed this
Ninth Day of May, 2023

Katherine Kelly Vidal
*Director of the United States Patent and Trademark Office*